(12) United States Patent
Stanfill et al.

(10) Patent No.: US 10,037,198 B2
(45) Date of Patent: Jul. 31, 2018

(54) DATA PROCESSING GRAPH COMPILATION

(71) Applicant: Ab Initio Technology LLC, Lexington, MA (US)

(72) Inventors: Craig W. Stanfill, Lincoln, MA (US); Richard Shapiro, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 19 days.

(21) Appl. No.: 15/234,197

(22) Filed: Aug. 11, 2016

(65) Prior Publication Data
US 2017/0046138 A1    Feb. 16, 2017

Related U.S. Application Data

(60) Provisional application No. 62/203,547, filed on Aug. 11, 2015.

(51) Int. Cl.
*G06F 8/41* (2018.01)
*G06F 8/40* (2018.01)

(52) U.S. Cl.
CPC .............. *G06F 8/41* (2013.01); *G06F 8/40* (2013.01); *G06F 8/456* (2013.01)

(58) Field of Classification Search
CPC ... G06F 8/41; G06F 8/456; G06F 8/35; G06F 8/40
See application file for complete search history.

(56) References Cited

U.S. PATENT DOCUMENTS 6,493,869 B1 * 12/2002 Kwiatkowski ............ G06F 8/30
                                                     717/106
8,359,586 B1 *  1/2013 Orofino, II ............. G06F 8/443
                                                     717/140
8,478,967 B2    7/2013 Bordelon et al.
(Continued)

OTHER PUBLICATIONS

Hauser et al., "Compiling Process Graphs into Executable Cod," Springer, 2004, Generative Programming and Component Engineering, Lecture Notes in Computer Science, vol. 3286, pp. 317-336, downloaded from the Internet at <url>:https://link.springer.com.*

(Continued)

*Primary Examiner* — Thuy Dao
*Assistant Examiner* — Stephen Berman
(74) *Attorney, Agent, or Firm* — Occhiuti & Rohlicek LLP

(57) ABSTRACT

A received graph-based program specification includes: a plurality of components, each corresponding to at least one operation; and a plurality of directed links each connecting an upstream component to a downstream component. Processed code is generated representing one or more groups of operations by: identifying a possible level of concurrency in a first group of operations based at least in part on a topology of the graph, such that multiple operations in the first group are not prevented by the topology of the graph from executing concurrently; analyzing at least some of the operations in the first group to determine runtime characteristics associated with the analyzed operations; and generating processed code for executing the operations, where the processed code enforces a reduced level of concurrency in the first group, lower than the identified possible level of concurrency, based at least in part on the determined runtime characteristics.

35 Claims, 14 Drawing Sheets

(56) References Cited

U.S. PATENT DOCUMENTS

| | | | |
|---|---|---|---|
| 8,510,709 | B2 | 8/2013 | Bordelon et al. |
| 9,645,802 | B2* | 5/2017 | Mehrara .................. G06F 8/45 |
| 9,690,550 | B2* | 6/2017 | Kee ........................... G06F 8/41 |
| 2004/0078780 | A1* | 4/2004 | Dutt ........................ G06F 8/456 717/106 |
| 2005/0034112 | A1 | 2/2005 | Stanfill |
| 2007/0271381 | A1 | 11/2007 | Wholey et al. |
| 2009/0083313 | A1* | 3/2009 | Stanfill ................. G06F 9/4436 |
| 2012/0060020 | A1* | 3/2012 | Gonion ................. G06F 8/4441 712/222 |
| 2012/0084789 | A1 | 4/2012 | Iorio |
| 2014/0053129 | A1 | 2/2014 | Von Platen et al. |
| 2015/0046684 | A1 | 2/2015 | Mehrara et al. |
| 2015/0113514 | A1* | 4/2015 | Chakradhar ............ G06F 8/456 717/149 |
| 2015/0172412 | A1* | 6/2015 | Escriva ............ G06F 17/30091 709/202 |
| 2015/0378697 | A1* | 12/2015 | Sathyanathan ........... G06F 8/41 717/146 |
| 2016/0085530 | A1* | 3/2016 | Duran Gonzalez ..... G06F 8/452 717/105 |
| 2016/0139901 | A1* | 5/2016 | Margiolas ............... G06F 8/456 717/150 |
| 2017/0017472 | A1* | 1/2017 | He ........................... G06F 8/41 |

OTHER PUBLICATIONS

Abmann, "How to uniformly specify program analysis and transformation with graph rewrite systems," Springer, 1996, International Conference on Compiler Construction, Lecture Notes in Computer Science, vol. 1060, pp. 121-135, downloaded from the Internet at <url>:https://link.springer.com.*

Lattner et al., "LLVM: A Compilation Framework for Lifelong Program Analysis & Transformation," 2004, CGO '04 Proceedings of the international symposium on Code generation and optimization: feedback-directed and runtime optimization. pp. 1-12, downloaded from the Internet at <url>:http://delivery.acm.org.*

International Search Report and Written Opinion, International Application No. PCT/US2016/046452, dated Sep. 30, 2016 (15 pages).

Lin, Bill, "Compiling Concurrent Programs for Embedded Sequential Execution," Integration, The VSLI Journal (40) 2007, 106-117.

\* cited by examiner

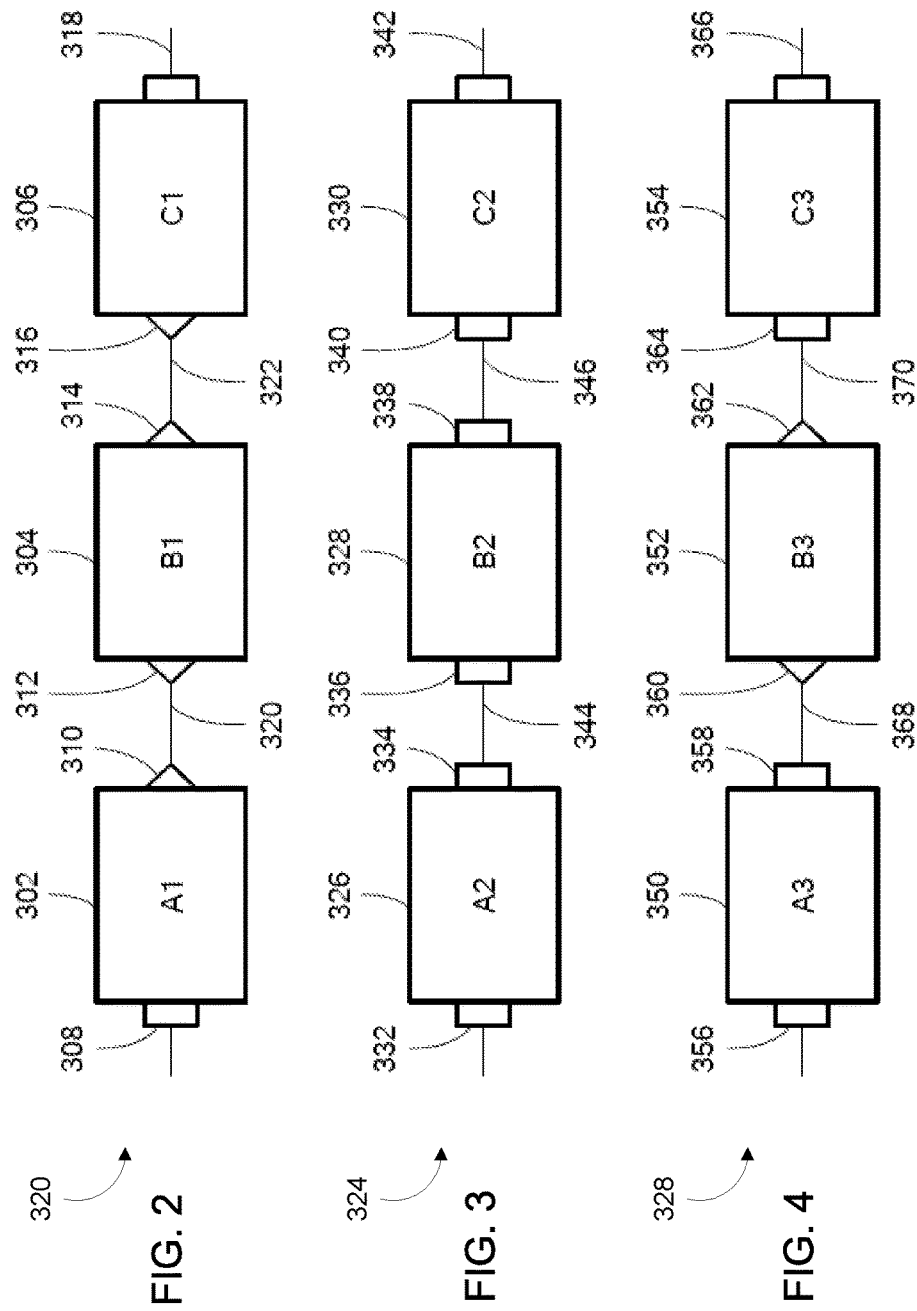

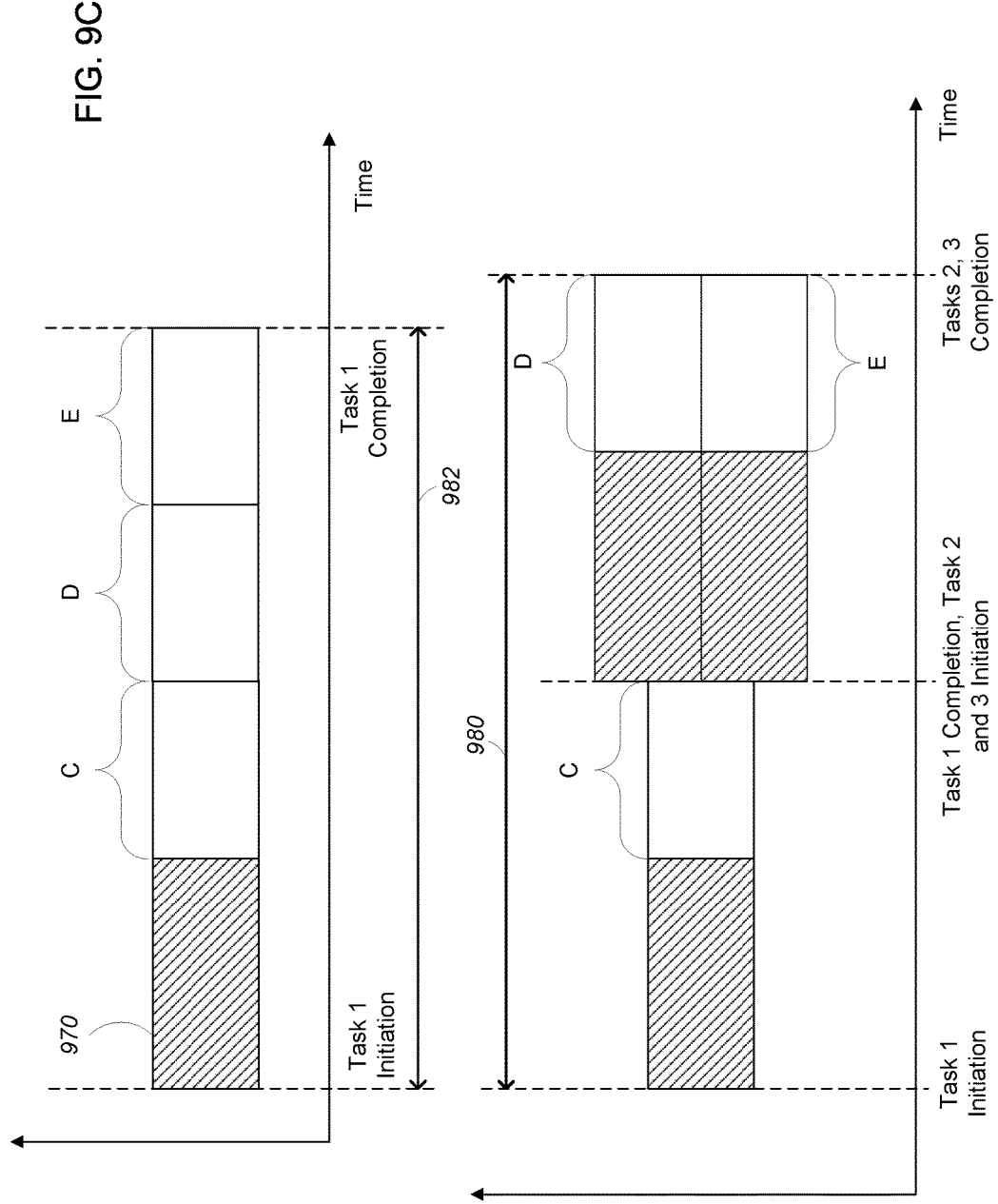

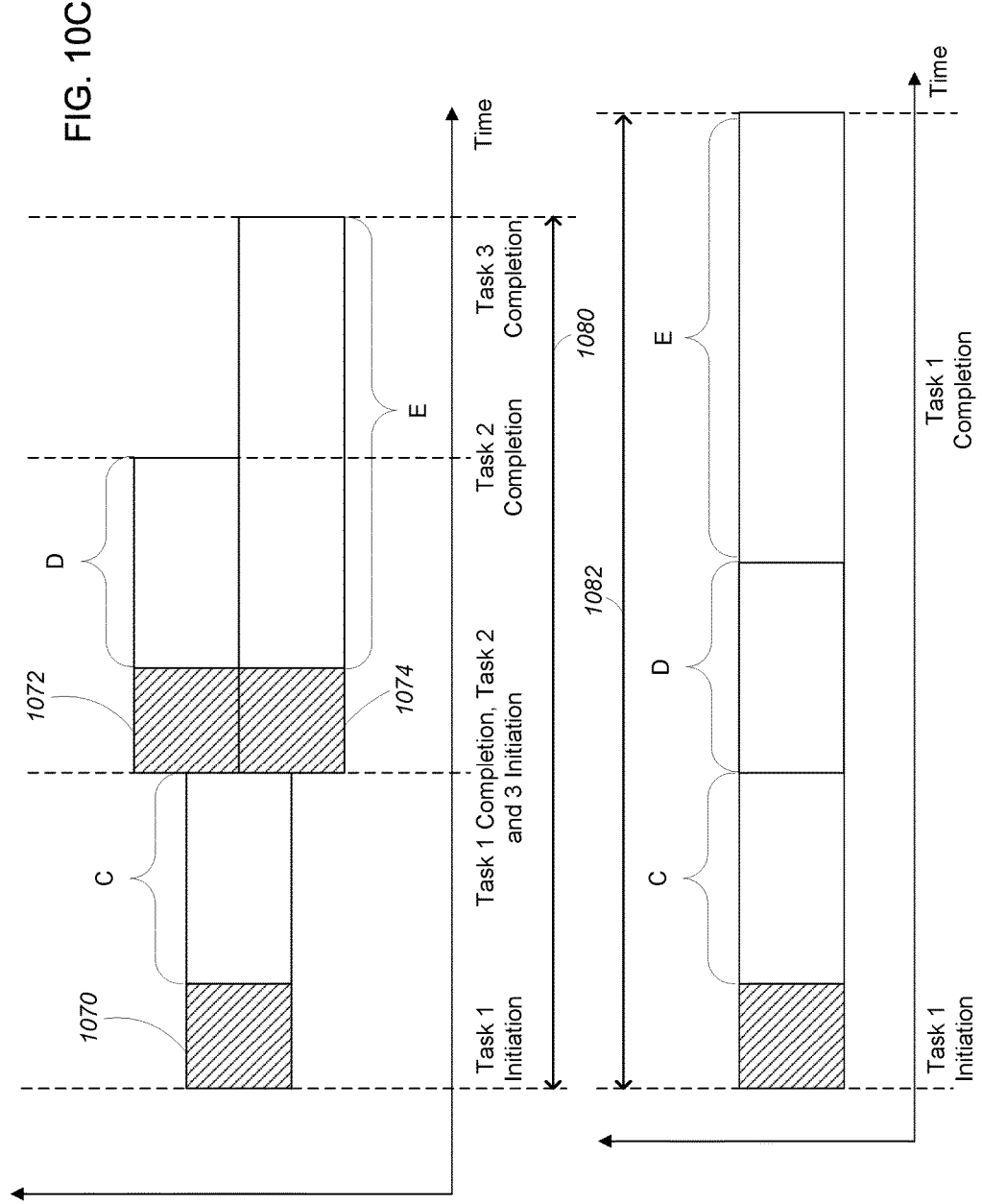

DATA PROCESSING GRAPH COMPILATION

CROSS-REFERENCE TO RELATED APPLICATIONS

This application claims priority to U.S. Application Ser. No. 62/203,547, filed on Aug. 11, 2015, incorporated herein by reference.

BACKGROUND

This description relates to an approach to compiling graph-based program specifications.

One approach to data flow computation makes use of a graph-based representation in which computational components corresponding to nodes (vertices) of a graph are coupled by data flows corresponding to links (directed edges) of the graph (called a "dataflow graph"). A downstream component connected to an upstream component by a data flow link receives an ordered stream of input data elements, and processes the input data elements in the received order, optionally generating one or more corresponding flows of output data elements. A system for executing such graph-based computations is described in prior U.S. Pat. No. 5,966,072, titled "EXECUTING COMPUTATIONS EXPRESSED AS GRAPHS," incorporated herein by reference.

Dataflow graphs are often specified such that there is a possibility that two or more components can execute concurrently (i.e., in parallel). Many systems for compiling and executing dataflow graphs capitalize on the possibility of concurrency by compiling dataflow graphs such that the components of the dataflow graphs execute concurrently, where possible. By doing so, these systems focus on executing the dataflow graph with a minimal latency.

SUMMARY

In one aspect, in general, an approach includes compiling a portion of a data processing graph in one of two compiling modes based on characteristics of the portion of the data processing graph. In a first of the compiling modes, concurrent execution of components is allowed. In a second of the compiling modes, concurrent execution of the components is not allowed and serial execution of the components is enforced. In some aspects, the first of the compiling modes is used when one or more components of the portion of the data processing graph include operations that may take a long amount of time relative to an amount of time that is required to spawn a "processing task" (also called simply a "task") (e.g., a process or thread in which the operations of one or more components are executed). In some aspects, the second of the compiling modes is used when substantially all of the components of the portion of the data processing graph include operations that take a short amount of time relative to an amount of time that is required to spawn a task.

In another aspect, in general, a method for compiling a graph-based program specification to execute on a computing system that supports concurrent execution of operations includes: receiving the graph-based program specification, the graph-based program specification including a graph that includes: a plurality of components, each corresponding to at least one operation; and a plurality of directed links, each directed link connecting an upstream component of the plurality of components to a downstream component of the plurality of components. The method also includes processing the graph-based program specification to generate processed code representing one or more groups of operations, the processing including: identifying a possible level of concurrency in a first group of the operations based at least in part on a topology of the graph, such that multiple operations in the first group are not prevented by the topology of the graph from executing concurrently; analyzing at least some of the operations in the first group to determine runtime characteristics associated with the analyzed operations; and generating processed code for executing the operations in the first group, where the processed code enforces a reduced level of concurrency in the first group, lower than the identified possible level of concurrency, based at least in part on the determined runtime characteristics.

Aspects can include one or more of the following features.

Analyzing at least some of the operations in the first group to determine runtime characteristics associated with the analyzed operations includes, for each of the analyzed operations, determining if that analyzed operation is a latent operation that potentially performs a computation over a period of time that is larger than a first threshold or that potentially waits for a response for a period of time that is larger than the first threshold.

Analyzing at least some of the operations in the first group to determine runtime characteristics associated with the analyzed operations includes, for each of the analyzed operation, determining if that analyzed operation is a member of an iterating set of one or more operations that executes multiple times in response to a single initiation of execution of the first group.

The first threshold is defined as a first period of time greater than a second period of time required to spawn a task for executing one or more operations.

The processed code enforces a reduced level of concurrency in the first group, lower than the identified possible level of concurrency, if neither of these conditions is met: (1) at least two operations in the first group that are not prevented by the topology of the graph from executing concurrently were both determined to be latent operations, or (2) at least one operation in the first group was determined to be a member of an iterating set of one or more operations.

The processed code enforces a reduced level of concurrency in the first group, lower than the identified possible level of concurrency, if the following additional condition is also not met: (3) a configuration of two or more operations in the first group imply an existence of an iterating set.

Enforcing a reduced level of concurrency in the first group, lower than the identified possible level of concurrency, includes enforcing serial execution of all of the operations in the first group.

One or more of the directed links indicate data flow between an upstream component and a downstream component.

One or more of the directed links indicate control flow between an upstream component and a downstream component.

Processing the graph-based program specification to generate processed code representing one or more groups of operations further includes: generating ordering information that specifies at least a partial ordering among the first group of the operations, where the ordering information is based at least in part on the topology of the graph; and wherein identifying the possible level of concurrency in the first group includes identifying a level of concurrency allowed by the partial ordering such that multiple operations in the first group are not prevented by the partial ordering from executing concurrently.

Generating the ordering information includes topologically sorting the first group of operations.

In another aspect, in general, software is stored in a non-transitory form on a computer-readable medium, for compiling a graph-based program specification to execute on a computing system that supports concurrent execution of operations. The software includes instructions for causing the computing system to receive the graph-based program specification, the graph-based program specification including a graph that includes: a plurality of components, each corresponding to a operation; and a plurality of directed links, each directed link connecting an upstream component of the plurality of components to a downstream component of the plurality of components. The software also includes instructions for causing the computing system to process the graph-based program specification to generate processed code representing one or more groups of operations, the processing including: identifying a possible level of concurrency in a first group of the operations based at least in part on a topology of the graph, such that multiple operations in the first group are not prevented by the topology of the graph from executing concurrently; analyzing at least some of the operations in the first group to determine runtime characteristics associated with the analyzed operations; and generating processed code for executing the operations in the first group, where the processed code enforces a reduced level of concurrency in the first group, lower than the identified possible level of concurrency, based at least in part on the determined runtime characteristics.

In another aspect, in general, a computing system for compiling a graph-based program specification includes: an input device or port configured to receive the graph-based program specification, the graph-based program specification including a graph that includes: a plurality of components, each corresponding to a operation; and a plurality of directed links, each directed link connecting an upstream component of the plurality of components to a downstream component of the plurality of components; and at least one processor configured to process the graph-based program specification to generate processed code representing one or more groups of operations, the processing including: identifying a possible level of concurrency in a first group of the operations based at least in part on a topology of the graph, such that multiple operations in the first group are not prevented by the topology of the graph from executing concurrently; analyzing at least some of the operations in the first group to determine runtime characteristics associated with the analyzed operations; and generating processed code for executing the operations in the first group, where the processed code enforces a reduced level of concurrency in the first group, lower than the identified possible level of concurrency, based at least in part on the determined runtime characteristics.

In another aspect, in general, a computing system for compiling a graph-based ix) program specification includes: means for receiving the graph-based program specification, the graph-based program specification including a graph that includes: a plurality of components, each corresponding to a operation; and a plurality of directed links, each directed link connecting an upstream component of the plurality of components to a downstream component of the plurality of components; and means for processing the graph-based program specification to generate processed code representing one or more groups of operations, the processing including: identifying a possible level of concurrency in a first group of the operations based at least in part on a topology of the graph, such that multiple operations in the first group are not prevented by the topology of the graph from executing concurrently; analyzing at least some of the operations in the first group to determine runtime characteristics associated with the analyzed operations; and generating processed code for executing the operations in the first group, where the processed code enforces a reduced level of concurrency in the first group, lower than the identified possible level of concurrency, based at least in part on the determined runtime characteristics.

Aspects may have one or more of the following advantages.

Among other advantages, aspects compile graph-based programs to achieve a tradeoff between computational latency and computational efficiency. In particular, aspects advantageously group components into groups that can concurrently execute and groups that cannot concurrently execute. The grouping of components is performed according to an optimality criterion such that the execution of the graph-based programs is optimized (e.g., high latency operations are allowed to concurrently execute, while low latency operations are not allowed to execute). In some examples, the optimality criterion ensures that concurrency is only used in situations where it results in improved computational efficiency and/or reduced computational latency.

Other features and advantages of the invention will become apparent from the following description, and from the claims.

DESCRIPTION OF DRAWINGS

FIG. 2 is a data processing graph including a number of output scalar port to input scalar port connections.

FIG. 3 is a data processing graph including a number of output collection ports to input collection port connections.

FIG. 4 is a data processing graph including an output collection port to input scalar port connection and an output scalar port to input collection port connection.

FIG. 9C is an illustration of execution of operations of the execution set of FIG. 9A compared to an alternative execution of those operations.

FIG. 10C is an illustration of execution of operations of the execution set of FIG. 10A compared to an alternative execution of those operations.

DESCRIPTION

Figure 1:
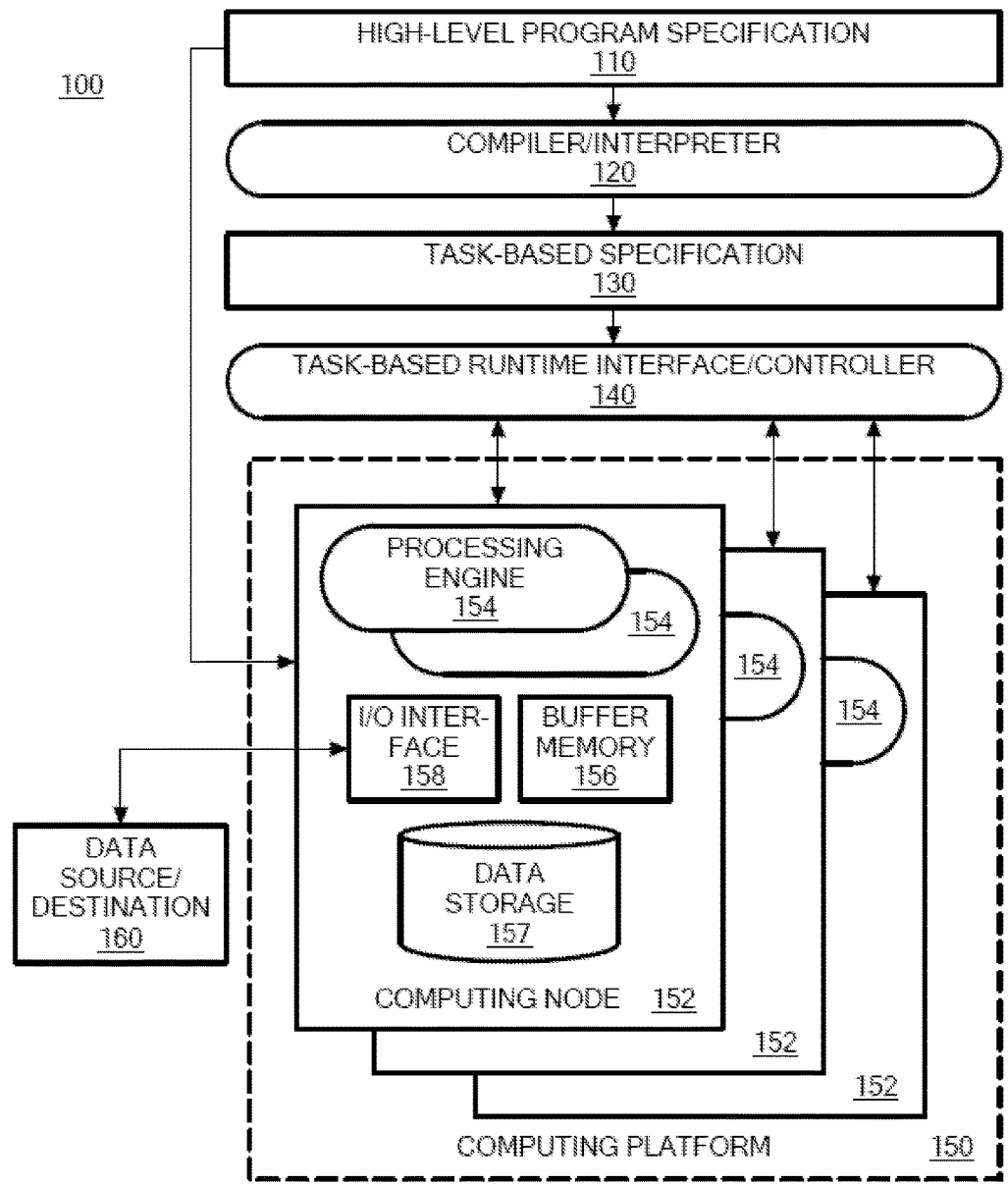
FIG. 1 is a block diagram of a task-based computation system.

Referring to FIG. 1, a task-based computation system 100 uses a high-level program specification 110 to control computation and storage resources of a computing platform 150 to execute the computation specified by the program specification 110. A compiler/interpreter 120 receives the high-level program specification 110 and generates a task-based specification 130 that is in a form that can be executed by a task-based runtime interface/controller 140. The compiler/interpreter 120 identifies one or more "execution sets" of one or more "components" that can be instantiated, individually or as a unit, as fine-grained tasks to be applied to each of multiple data elements. Part of the compilation or interpretation process involves identifying these execution sets and preparing the sets for execution, as described in more detail below. It should be understood that the compiler/interpreter 120 can make use of a variety of techniques, for example, to optimize the efficiency of the computation performed on the computing platform 150. A target program specification generated by the compiler/interpreter 120 can itself be in an intermediate form that is to be further processed (e.g., further compiled, interpreted, etc.) by another part of the system 100 to produce the task-based specification 130. The discussion below outlines one or more examples of such transformations but of course other approaches to the transformations are possible as would be understood, for example, by one skilled in compiler design.

Generally, the computation platform 150 is made up of a number of computing nodes 152 (e.g., individual server computers that provide both distributed computation resources and distributed storage resources) thereby enabling high degrees of parallelism. The computation represented in the high-level program specification 110 is executed on the computing platform 150 as relatively fine-grain tasks, further enabling efficient parallel execution of the specified computation.

In some embodiments, the high-level program specification 110 is a type of graph-based program specification called a "data processing graph" that is able to specify both the flow of data (as in a dataflow graph), and the flow of control. A data processing graph also includes mechanisms for supporting parallelism, as described in more detail below, which enable the compiler/interpreter 120 to dynamically introduce parallelism in the components of the data processing graph. For example, instances of components of a data processing graph are spawned as tasks (e.g., a thread in which the operations of one or more components are executed) in the context of executing the data processing graph, and are generally executed in multiple of the computing nodes 152 of the computing platform 150. Very generally, the controller 140 provides supervisory control aspects of the scheduling and locus of execution of those tasks in order to achieve performance goals for the system, for example, related to allocation of computation load, reduction in communication or input/output overhead, used of memory resources.

After translation by the compiler/interpreter 120, the overall computation is expressed as a task-based specification 130 in terms of procedures of a target language that can be executed by the computing platform 150. These procedures make use of primitives, such as "spawn" and "wait" and may include within them or call the work procedures specified by a programmer for components in the high-level (e.g., graph-based) program specification 110.

In some cases, each instance of a component is implemented as a task, with some tasks implementing a single instance of a single component, some tasks implementing a single instance of multiple components of an execution set, and some tasks implementing successive instances of a component. The particular mapping from components and their instances depends on the particular design of the compiler/interpreter, such that the resulting execution remains consistent with the semantic definition of the computation.

Generally, tasks in the runtime environment are arranged hierarchically, for example, with one top-level task spawning multiple tasks, for example, one for each of the top-level components of the data processing graph. Similarly, computation of an execution set may have one task for processing an entire collection, with multiple (i.e., many) sub-tasks each being used to process an element of the collection.

In some examples, each computing node 152 has one or more processing engines 154. In at least some implementations, each processing engine is associated with a single operating system process executing on the computing node 150. Depending on the characteristics of the computing node, it may be efficient to execute multiple processing engines on a single computing node. For example, the computing node may be a server computer with multiple separate processors, or the server computer may have a single processor that has multiple processor cores, or there may be a combination of multiple processors with multiple cores. In any case, executing multiple processing engines may be more efficient than using only a single processing engine on a computing node 152.

1 Data Processing Graphs

In some embodiments, the high-level program specification 110 is a type of graph-based program specification called a "data processing graph" that includes a set of "components", each specifying a portion of an overall data processing computation to be performed on data. The components are represented, for example, in a programming user interface and/or in a data representation of the computation, as nodes in a graph. Unlike some graph-based program specifications, such as the dataflow graphs described in the Background above, the data processing graphs may include links between the nodes that represent any of transfer of data, or transfer of control, or both. One way to indicate the characteristics of the links is by providing different types of ports on the components. The links are directed links that are coupled from an output port of an upstream component to an input port of a downstream component. The ports have indicators that represent characteristics of how data elements are written and read from the links and/or how the components are controlled to process data.

These ports may have a number of different characteristics. One characteristic of a port is its directionality as an input port or output port. The directed links represent data and/or control being conveyed from an output port of an upstream component to an input port of a downstream component. A developer is permitted to link together ports of different types. Some of the data processing characteristics of the data processing graph depend on how ports of different types are linked together. For example, links between different types of ports can lead to nested subsets of components in different "execution sets" that provide a hierarchical form of parallelism, as described in more detail below. Certain data processing characteristics are implied by the type of the port. The different types of ports that a component may have include:

Input or output collection ports, meaning that an instance of the component will read or write, respectively, all data elements of a collection that will pass over the link coupled to the port. For a pair of components with a single link between their collection ports, the downstream component is generally permitted to read data elements as they are being written by an upstream component, enabling pipeline parallelism between upstream and downstream components. The data elements can also be reordered, which enables efficiency in parallelization, as described in more detail below. In some graphical representations, for example in programming graphical interfaces, such collection ports are generally indicated by a square connector symbol at the component.

Input or output scalar ports, meaning that an instance of the component will read or write, respectively, at most one data element from or to a link coupled to the port. For a pair of components with a single link between their scalar ports, serial execution of the downstream component after the upstream component has finished executing is enforced using transfer of the single data element as a transfer of control. In some graphical representations, for example in programming graphical interfaces, such scalar ports are generally indicated by a triangle connector symbol at the component.

Input or output control ports, which are similar to scalar inputs or outputs, but no data element is required to be sent, and are used to communicate transfers of control between components. For a pair of components with a link between their control ports, serial execution of the downstream component after the upstream component has finished executing is enforced (even if those components also have a link between collection ports). In some graphical representations, for example in programming graphical interfaces, such control ports are generally indicated by a circular connector symbol at the component.

These different types of ports enable flexible design of data processing graphs, allowing powerful combinations of data and control flow with the overlapping properties of the port types. In particular, there are two types of ports, collection ports and scalar ports, that convey data in some form (called "data ports"); and there are two types of ports, scalar ports and control ports, that enforce serial execution (called "serial ports"). A data processing graph will generally have one or more components that are "source components" without any connected input data ports and one or more components that are "sink components" without any connected output data ports. Some components will have both connected input and output data ports. In some embodiments, the graphs are not permitted to have cycles, and therefore must be a directed acyclic graph (DAG). This feature can be used to take advantage of certain characteristics of DAGs, as described in more detail below.

By connecting different types of ports in different ways, a developer is able to specify different types of link configurations between ports of components of a data processing graph. One type of link configuration may correspond to a particular type of port being connected to the same type of port (e.g., a scalar-to-scalar link), and another type of link configuration may correspond to a particular type of port being connected to a different type of port (e.g., a collection-to-scalar link), for example. These different types of link configurations serve both as a way for the developer to visually identify the intended behavior associated with a part of the data processing graph, and as a way to indicate to the compiler/interpreter 120 a corresponding type of compilation process needed to enable that behavior. While the examples described herein use unique shapes for different types of ports to visually represent different types of link configurations, other implementations of the system could distinguish the behaviors of different types of link configurations by providing different types of links and assigning each type of link a unique visual indicator (e.g., thickness, line type, color, etc.). However, to represent the same variety of link configurations possible with the three types of ports listed above using link type instead of port type, there would be more than three types of links (e.g., scalar-to-scalar, collection-to-collection, control-to-control, collection-to-scalar, scalar-to-collection, scalar-to-control, etc.)

The compiler/interpreter 120 performs procedures to prepare a data processing graph for execution. A first procedure is an execution set discovery pre-processing procedure to identify a hierarchy of potentially nested execution sets of components. A second procedure is a control graph generation procedure to generate, for each execution set, a corresponding control graph that the compiler/interpreter 120 will use to form control code that will effectively implement a state machine at runtime for controlling execution of the components within each execution set.

A component with at least one input data port specifies the processing to be performed on each input data element or collection (or tuple of data elements and/or collections on multiple of its input ports). One form of such a specification is as a procedure to be performed on one or a tuple of input data elements and/or collections. If the component has at least one output data port, it can produce corresponding one or a tuple of output data elements and/or collections. Such a procedure may be specified in a high level statement-based language (e.g., using Java source statements, or a Data Manipulation Language (DML) for instance as used in U.S. Pat. No. 8,069,129 "Editing and Compiling Business Rules"), or may be provided in some fully or partially compiled form (e.g., as Java bytecode). For example, a component may have a work procedure whose arguments include its input data elements and/or collections and its output data elements and/or collections, or more generally, references to such data elements or collections or to procedures or data objects (referred to herein as "handles") that are used to acquire input and provide output data elements or collections.

Work procedures may be of various types. Without intending to limit the types of procedures that may be specified, one type of work procedure specifies a discrete computation on data elements according to a record format. A single data element may be a record from a table (or other type of dataset), and a collection of records may be all of the records in a table. For example, one type of work procedure for a component with a single input scalar port and a single output scalar port includes receiving one input record, performing a computation on that record, and providing one output record. Another type of work procedure may specify how a tuple of input records received from multiple input scalar ports are processed to form a tuple of output records sent out on multiple output scalar ports.

The semantic definition of the computation specified by the data processing graph is inherently parallel in that it represents constraints and/or lack of constraints on ordering and concurrency of processing of the computation defined by the graph. Therefore, the definition of the computation does not require that the result is equivalent to some sequential ordering of the steps of the computation. On the other hand, the definition of the computation does provide certain constraints that require sequencing of parts of the computation, and restrictions of parallel execution of parts of the computation.

In the discussion of data processing graphs, implementation of instances of components as separate "tasks" in a runtime system is assumed as a means of representing sequencing and parallelization constraints. Generally, each component in a data processing graph will be instantiated in the computing platform a number of times during execution of the graph. The number of instances of each component may depend on which of multiple execution sets the component is assigned to. When multiple instances of a component are instantiated, more than one instance may execute in parallel, and different instances may execute in different computing nodes in the system. The operations performed by the components and the interconnections of the components, including the types of ports, determine the nature of parallel processing that is permitted by a specified data processing graph.

The different types of data ports on various components allow data to pass over links between components in different ways depending on the types of input and output ports that link those components. As described above, a scalar port represents production (for an output scalar port) or consumption (for an input scalar port) of at most a single data element (i.e., 0 or 1 data elements). Whereas, a collection port represents production (for an output collection port) or consumption (for an input collection port) of a set of potentially multiple data elements. By supporting both types of data ports in a single data processing graph, the model allows a developer to easily indicate the behavior that is desired.

Referring to FIG. 2, a data processing graph 300 includes a series of three connected components, a first component (A1) 302, a second component (B1) 304, and a third component (C1) 306. The first component includes a collection type input port 308 and a scalar type output port 310. The second component 304 includes a scalar type input port 312 and a scalar type output port 314. The third component includes a scalar type input port 316 and a collection type output port 318.

A first link 320 connecting the output scalar port 310 of the first component 302 to the input scalar port 312 of the second component 304 both allows data to pass between the first component 302 and the second component 304 and at the same time to enforces serial execution of the first and second components 302, 304. Similarly, a second link 322 connecting the output scalar port 314 of the second component 304 to the input scalar port 316 of the third component 306 both allows data to pass between the second component 304 and the third component 306 and enforces serial execution of the second and third components 304, 306.

Due to the interconnections of the scalar ports in FIG. 2, the second component 304 begins executing only after the first component 302 completes (and passes a single data element over the first link 320), and the third component 306 begins executing only after the second component 304 completes (and passes a single data element over the second link 322). That is, each of the three components in the data processing graph runs once in the strict sequence A1/B1/C1.

In the exemplary data processing graph of FIG. 2, the input port 308 of the first component 302 and the output port of the third component 318 happen to be collection ports, which have no effect on the serial execution behavior of the first, second, and third components 302, 304, 306 imposed by the scalar ports connecting them.

In general, collection ports are used both to pass a collection of data elements between components and at the same time may give the runtime system a license to reorder the data elements within that set. Reordering of data elements of an unordered collection is allowed because there is either no dependence on the state of the computation from one data element to another data element, or if there is global state that is accessed as each data element is processed the final state is independent of order in which those data elements were processed. This license to reorder provides flexibility for delaying decisions about parallelization until runtime.

Referring to FIG. 3, a data processing graph 324 includes a series of three connected components, a first component (A2) 326, a second component (B2) 328, and a third component (C2) 330. The first component 326 includes a collection type input port 332 and a collection type output port 334. The second component 328 includes a collection type input port 336 and a collection type output port 338. The third component 330 includes a collection type input port 340 and a collection type output port 342.

Each of the three components 326, 328, 330 specifies how a collection of one or more input elements is processed to generate a collection of one or more output elements. There is not necessarily a one-to-one correspondence between a particular input element and a particular output element. For example, a number of data elements in a first collection of data elements 344 between the first component 326 and the second component 328 may be different than a number of elements in a second collection of data elements 346 between the second component 328 and the third component 330. The only constraints placed on connections between collection ports is that each data element in the collection is passed from one collection port to another, while allowing arbitrary reordering between the first component 326 and the second component 328 and between the second component 328 and the third component 330 with respect to the order in which they are processed. Alternatively, in other examples, the collection ports can optionally be configured to preserve order. In this example, the three components 326, 328, 330 start up together and run concurrently, allowing pipeline parallelism.

The compiler/interpreter 120 described in relation to FIG. 1 is configured to recognize collection port to collection port connections and translate the computation into executable code in a manner that is appropriate for the computation being performed. The unordered nature of the collection data link gives the compiler/interpreter 120 flexibility in how this is accomplished. For example, if it happens to be the case that, for the second component 328, each output element is computed based on a single input element (i.e., there is no state maintained across data elements), the compiler/interpreter 120 may allow the runtime system to dynamically parallelize the processing of the data elements by instantiating as many as one instance of the component per data element (e.g., depending on the computing resources available at runtime). Optionally, state can be maintained across data elements in components that have input collection ports in special cases. But in the general case, the runtime system can be allowed to parallelize the component's task. For example, if the runtime system detects that no global state is being maintained, it may be allowed to parallelize the task. Some components can also be configured to support maintaining state, in which case parallelization may be disallowed. If the collection is unordered, the fact that order does not need to be preserved among data elements means that each instance of the second component 328 can provide its output data element to the third component 330 as soon as it is available, and the third component 330 can begin processing those data elements before all instances of the second component 328 have finished.

2 Execution Sets

In some examples, a graph developer can explicitly indicate that the processing of the data elements in a collection of data may be dynamically parallelized by connecting a collection type output port of one component to a scalar type input port of another component. In addition to indicating that such a component, such an indication also requires that state is not maintained between processing of different elements of the collection. Referring to FIG. 4, a data processing graph 348 includes a series of three connected components, a first component (A3) 350, a second component (B3) 352, and a third component (C3) 354. The first component 350 includes a collection type input port 356 and a collection type output port 358. The second component 352 includes a scalar type input port 360 and a scalar type output port 362. The third component 354 includes a collection type input port 364 and a collection type output port 366.

The collection type output port 358 of the first component is connected to the scalar type input port 360 of the second component 352 by a first link 368 and the scalar type output port 362 of the second component 352 is connected to the collection type input port 364 by a second link 370. As is described in greater detail below, a link from a collection type output port to a scalar type input port implies an entry point into an "execution set" (or "iterating set") and a link from a scalar type output port to a collection type input port implies an exit point of an execution set. Very generally, as is described in greater detail below, components included in an execution set may be dynamically parallelized by the runtime controller to process data elements from a collection of data elements.

In FIG. 4, the link 368 between the collection type output port 358 of the first component 350 and the scalar type input port 360 of the second component 352 implies an entry point into an execution set. The link 370 between the scalar type output port 362 of the second component 352 and the collection type input port 364 of the third component 354 implies an exit point of the execution set. That is, the second component 352 is the only component in the execution set.

Since the second component 352 is included in the execution set, a separate instance of the second component 352 is launched for each data element received from the collection type output port 358 of the first component 350. At least some of the separate instances may run in parallel, depending on decisions that may not be made until runtime. In this example the first (350) and third (354) components start up together and run concurrently, while the second component (352) runs once for each data element received over the link 368. As is described above in relation to FIG. 1, the compiler/interpreter 120 performs an execution set discovery pre-processing procedure on a data processing graph to prepare the data processing graph for execution. An execution set is a set of one or more components that can be invoked as a unit and applied to a portion of data, such as a portion of the data elements of an output collection port. Therefore, at most one instance of each component in the execution set is executed for each input element (or tuple of input elements presented to multiple input ports of the set). Within the execution set, sequencing constraints are imposed by the links to scalar and control ports, with parallel execution of the components in an execution set being permissible as long as the sequencing constraints are not violated. In examples in which there are at least some components that are permitted to execute in parallel, the execution set may be implemented using multiple tasks, for example, a task for the execution set as a whole, and one or more sub-tasks for concurrent execution of an instance of one or more of the components. Therefore, tasks representing different instances of the execution set may themselves be broken down into even finer-grained tasks, for example, with sub-tasks that may execute concurrently. Tasks for different execution sets may generally be executed independently and in parallel. So if a large dataset has a million records, for example, there may be a million independent tasks. Some of the tasks may be executed on different nodes 152 of the computing platform 150. Tasks may be executed using lightweight threads that may be efficiently executed concurrently, even on a single node 152.

In general, the execution sets identified by the assignment algorithm(s) (i.e., the execution sets other than a root execution set) receive data elements through a "driving" scalar data port at the boundary of the execution set. For each data element received at the driving input scalar data port of the execution set, each of the components within the execution set are executed once (if activated) or not at all (if suppressed). Multiple instances of the execution set can be instantiated and executed in parallel to process multiple data elements that are available to the execution set from an upstream collection port. A degree of parallelism for an execution set can be determined at runtime (and includes a possible decision not to parallelize the execution set), and is limited only by the computational resources available at runtime. The individual outputs of the independent instances of the execution set are gathered at output port(s) of the execution set, regardless of order, and are made available to downstream components. Alternatively, in other embodiments, execution sets other than the root execution set can be recognized (in some cases, based on user input) that do not require a driving input scalar data port. Such an execution set without a driving input scalar data port can be executed, using the procedures described herein, in a single instance if appropriate (e.g., for a latched execution set described below), or in multiple instances in parallel. For example, a parameter can be set that determines a number of times an execution set will execute, and/or a number of parallel instances of the execution set that will execute.

Very generally, the execution set discovery procedure uses an assignment algorithm that determines subsets of components within the data processing graph that are to be applied as a set to input elements of an unordered collection of data elements. The assignment algorithm traverses the data processing graph and assigns each component to a subset based on assignment rules. As is made apparent in the following examples, a given data processing graph may include a number of execution sets nested at different levels of an execution set hierarchy.

Figure 5A:
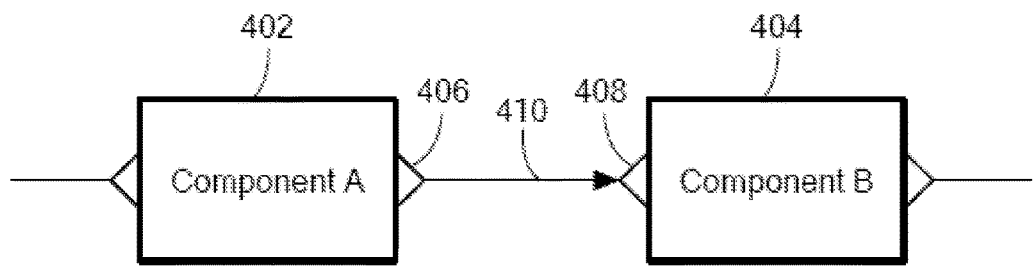
FIG. 5A is scalar port to scalar port connection between two components.

In the data processing graphs described herein, there are two types of data ports: scalar data ports and collection data ports. In general, a pair of linked components (i.e., upstream component and downstream component) will be in the same execution set by default if they are connected by a link between ports of the same type (unless they are in different execution sets for another reason). In FIG. 5A, component A 402 has an output port 406 with a scalar type and component B 404 has an input port 408 with a scalar type. Since the link 410 between component A 402 and component B 404 connects two scalar type ports, components A and B 402, 404 are in the same execution set in this example. In FIG. 5A, since the link between component A 402 and component B 404 is a scalar-to-scalar link, either 0 data elements or 1 data element is passed between upstream component A 402 and downstream component B 404 over the link 410. Upon completion of upstream component A's 402 processing, a data element is passed over the link 410, unless upstream component A 402 is suppressed (as is described above), in which case no data element is passed over the link 410.

Figure 5B:
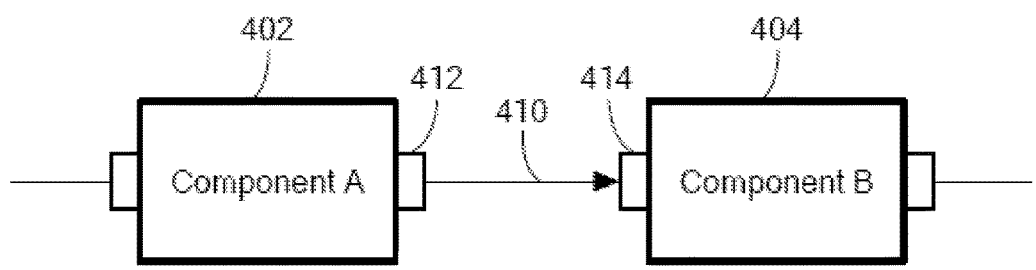
FIG. 5B is a collection port to collection port connection between two components.

Referring to FIG. 5B, component A 402 has an output port 412 with a collection type and component B 404 has an input port 414 with a collection type. Since the link 410 between component A 402 and component B 404 connects two collection type ports, component A 402 and component B 404 are also in the same execution set in this example. In FIG. 5B, since the link 410 between component A 402 and component B 404 is a collection-to-collection link, a set of data elements is passed between the upstream and downstream components over the link 410.

Figure 5C:
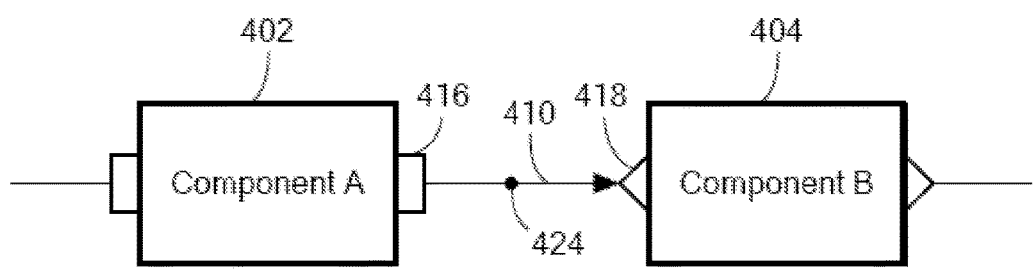
FIG. 5C is a collection port to scalar port connection between two components, including an execution set entry point.

When there is a mismatch between the port types on either end of a link, there is an implicit change in a level of the execution set hierarchy. In particular, mismatched ports represent entry points or exit points to an execution set at a particular level of the execution set hierarchy. In some examples, an execution set entry point is defined as a link between a collection type output port and a scalar type input port. In FIG. 5C, one example of an execution set entry point 424 is illustrated at the link 410 between component A 402 and component B 404, since the output port 416 of component A 402 is a collection type port and the input port 418 of component B 404 is a scalar type port.

Figure 5D:
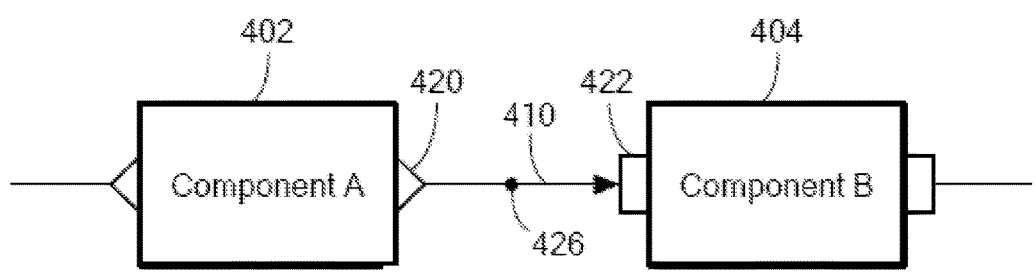
FIG. 5D is a scalar port to collection port connection between two components, including an execution set exit point.

In some examples, an execution set exit point is defined as a link between a scalar type output port and a collection type input port. Referring to FIG. 5D, one example of an execution set exit point 426 is illustrated at the link 410 between component A 402 and component B 404, since the output port 420 of component A 402 is a scalar type port and the input port 422 of component B 404 is a collection type port.

The assignment algorithm implemented prior to compilation and/or interpretation by the compiler/interpreter 120 uses execution set entry and execution set exit points to discover the execution sets present in the data processing graph.

3 Execution Set Compilation

Figure 6:
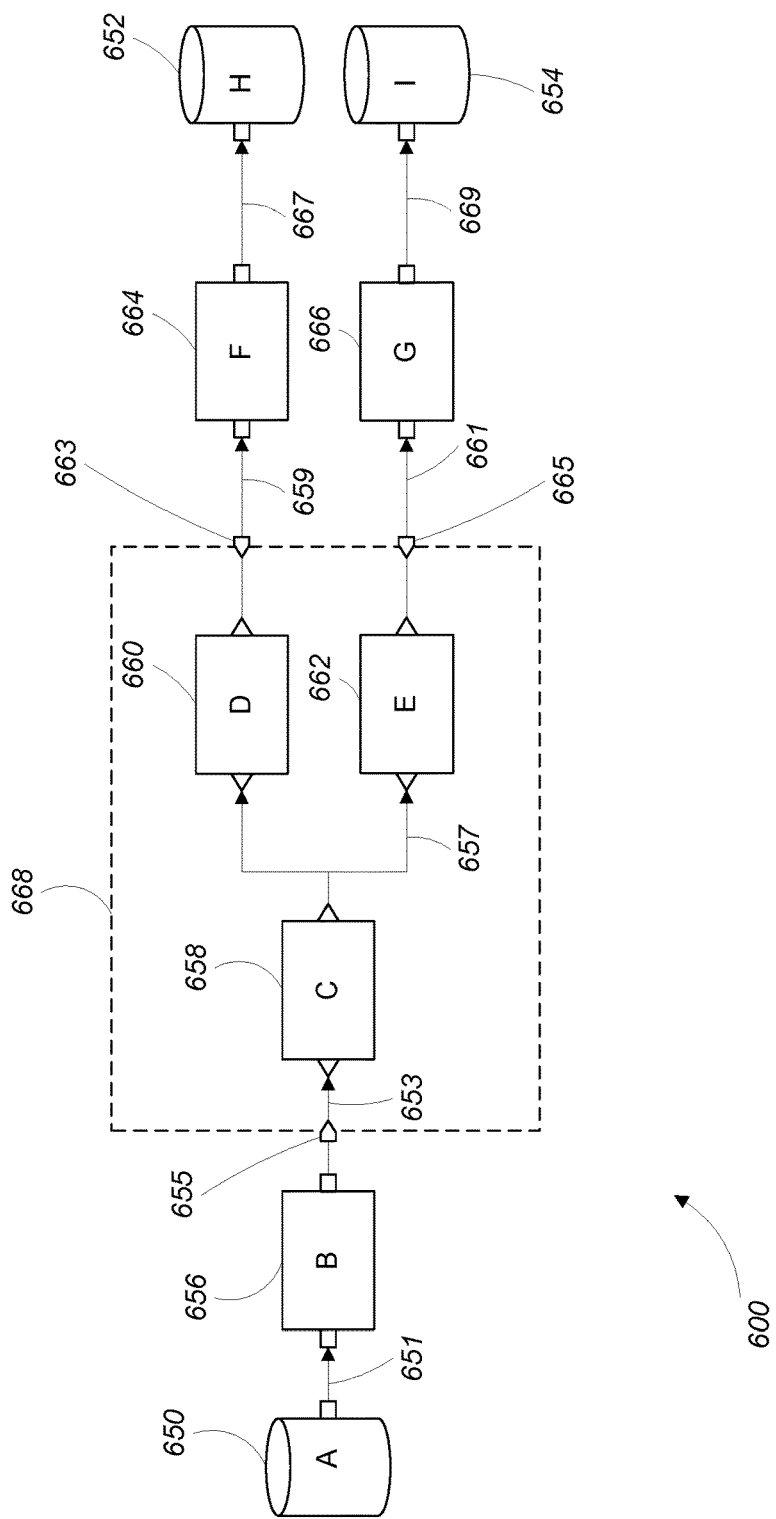
FIG. 6 is a data processing graph including an execution set.

Referring to FIG. 6, one example of a data processing graph 600 receives input data from a data source, A 650, processes the input data using a number of components, and stores the results of processing the data in a first data sink, H 652 and a second data sink, I 654. The components of the data processing graph 600 include a first component, B 656, a second component, C 658, a third component, D 660, a fourth component, E 662, a fifth component, F 664, and a sixth component, G 666.

A first flow 651 connects an output collection port of the data source 650 to an input collection port of the first component, B 656. A second flow 653 connects an output collection port of the first component, B 656 to an input scalar port of the second component, C 658. Note that since the second flow 653 connects an output collection port to an input scalar port, an execution set entry point 655 exists between the first component, B 656 and the second component, C 658.

A third flow 657 connects an output scalar port of the second component, C 658 to input scalar ports of both the third component, D 660 and the fourth component, E 662. A fourth flow 659 connects an output scalar port of the third component, D 660 to an input collection port of the fifth component, F 664. A fifth flow 661 connects an output scalar port of the fourth component 662 to an input collection port of the sixth component, G 666. Note that since the fourth flow 659 and the fifth flow 661 connect output scalar ports to input collection ports, a first execution set exit point 663 exists between the third component, D 660 and the fifth component, F 664 and a second execution set exit point 665 exists between the fourth component, E 662 and the sixth component, G 666.

A sixth flow 667 connects the output collection port of the fifth component, F 664 to the input collection port of the first data sink, H 652. A seventh flow 669 connects the output collection port of the sixth component, G 666 to the input collection port of the second data sink, I, 654.

As is noted above, when the compiler/interpreter 120 prepares the data processing graph 600 for execution, it first performs an execution set discovery pre-processing procedure to identify a hierarchy of potentially nested execution sets of components. For the exemplary data processing graph 600 of FIG. 6, the execution set discovery pre-processing procedure identifies a first execution set 668 as delimited by the execution set entry point 655, the first execution exit point 663, and the second execution set exit point 665. As is apparent from the figure, the first execution set 668 includes the second component, C 658, the third component, D 660, and the fourth component, E 662.

After identifying the execution set 668, the compiler/interpreter 120 performs a control graph generation procedure to generate a control graph for the first execution set that the compiler/interpreter 120 will use to form control code that will effectively implement a state machine at runtime for controlling execution of the components within the first execution set. One step in generating the control graph includes grouping the components into task groups.

In some examples, the compiler/interpreter 120 groups each of the components in the data processing graph, including the components in the execution set 668, into one or more task groups. When the data processing graph 600 executes, a task is spawned for each task group, and the operations of the components belonging to the task group are performed within the task. While all components of the data processing graph are grouped into task groups, the aspects described herein relate primarily to grouping of components within an execution set into task groups. For this reason, the remaining discussion relates primarily to the grouping of the components in the execution set 668 into task groups.

A number of different groupings of the components of the execution set 668 into task groups are possible, with each different grouping having associated advantages and disadvantages. In general, just how the components of the execution set 668 are optimally grouped into task groups depends on an optimality criterion.

3.1 Compiling for Latency Minimization

For example, if an optimality criterion specifies than an optimal grouping of the components of the execution set 668 achieves minimum computational latency, then one possible grouping of the components into task groups includes grouping each component into its own individual task group.

Doing so allows for the operations (sometimes referred to as the "work procedure") of components to run concurrently, when possible. For example, in the execution set 668, a first task group can be assigned to the second component, C 658, a second task group can be assigned to the third component, D 660, and a third task group can be assigned to the fourth component, E 662.

Figure 7:
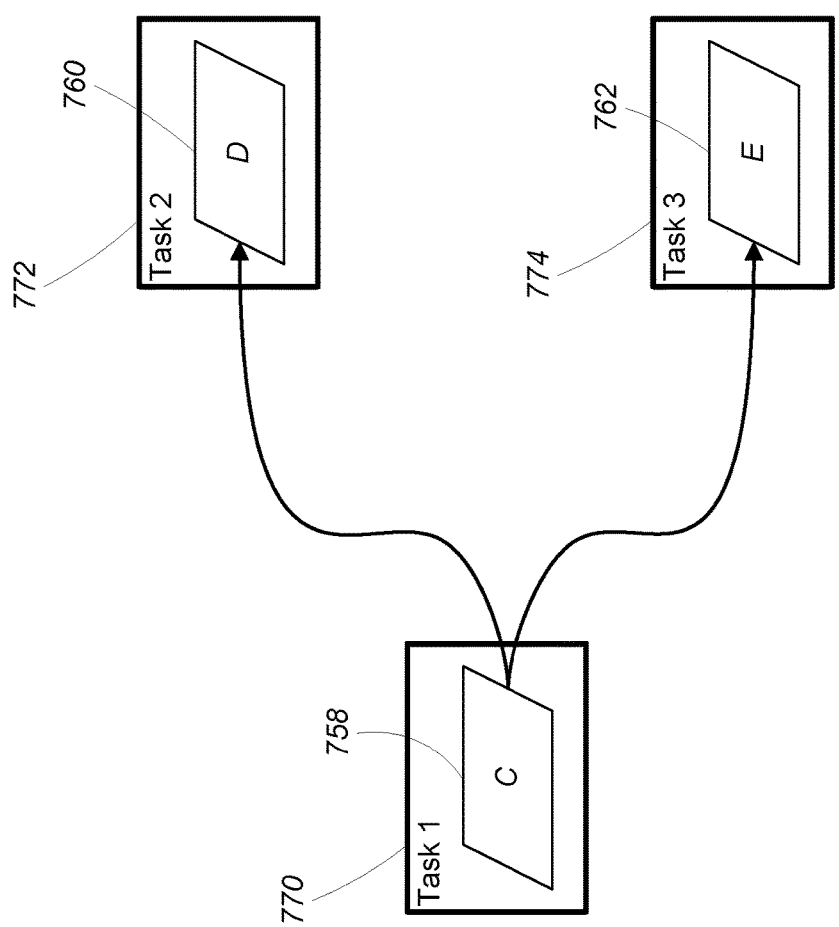
FIG. 7 is a grouping of operations of the components of the execution set of FIG. 6 into multiple tasks.

Referring to FIG. 7, when the execution set 668 of the data processing graph 600 executes, a first task 770 is spawned for the first task group and the operations of the second component, C 758 are performed in the first task 770. When the operations of the second component, C 758 complete, the first task spawns a second task 772 for the second task group and a third task 774 for the third task group. The operations of the third component, D 760 are performed in the second task 772 concurrently with the operations of the fourth component, E 762 being performed in the third task 774.

Advantageously, by performing the operations of the third component, D 760 concurrently with the operations of the fourth component, E 762, computational latency is minimized since neither component needs to wait for the other to complete before performing its operations. On the other hand, there is a cost in both computing resources and time associated with spawning multiple tasks. That is, grouping the components of the execution set 668 into task groups for minimum computational latency is not the most efficient way to group the components (where efficiency is defined as a measure of an amount of computing resources used to perform a given task).

3.2 Compiling for Efficiency Maximization

Alternatively, if an optimality criterion specifies that an optimal grouping of the components of the execution set 668 achieves maximum efficiency (as defined above), then the components of the execution set 668 are grouped into a single task group. Doing so requires that the operations of the components of the execution set 668 are performed serially within a single task, even when concurrency is possible.

Figure 8:
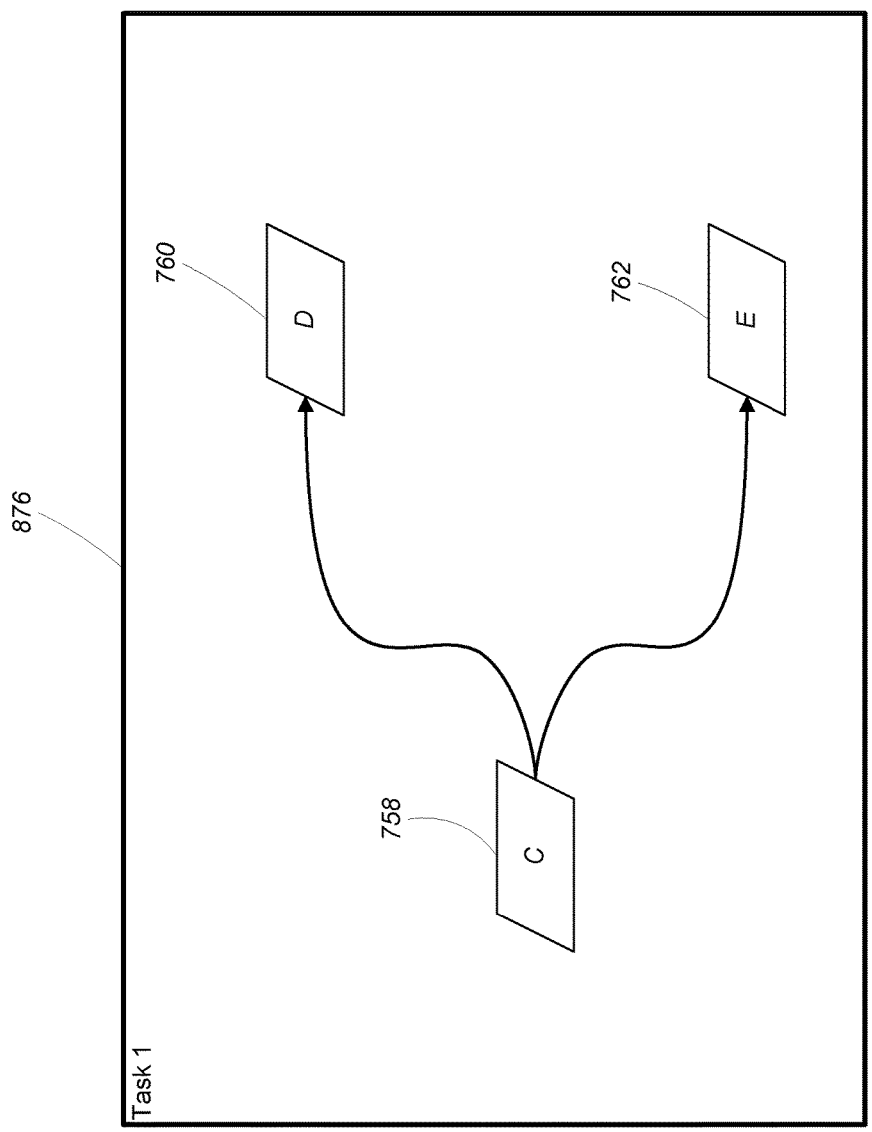
FIG. 8 is a grouping of operations of the components of the execution set of FIG. 6 into a single task.

For example, for the execution set 668, a first task group can include the second component, C 658, the third component, D 660, and the fourth component, E 662. Referring to FIG. 8, when the execution set 668 of the data processing graph 600 executes, a single task 876 is spawned for the first task group and the operations of the second component, C 758, the third component, D 760, and the fourth component, E 762 are performed serially (i.e., one at a time) within the single task. In some examples, the operations of the second component, C 758, the third component, D 760, and the fourth component, E 762 are performed in a topologically sorted order to ensure that an order of operations specified in the data processing graph 600 is preserved.

One advantage of performing the operations of the execution set 668 serially in a single task is that an efficiency of executing the operations is maximized. In particular, an amount of computing resources required to execute the data processing graph is minimized, thereby avoiding the overhead associated with spawning multiple tasks. Of course, serial execution of multiple tasks has the disadvantage of potentially taking a longer time to complete than concurrent execution of multiple tasks.

3.3 Compiling for Latency Vs. Efficiency Tradeoff

In some examples, an optimality criterion specifies than an optimal grouping of the components of the execution set 668 into task groups achieves a tradeoff between latency minimization and efficiency. A number of exemplary approaches for achieving such a tradeoff are described in the following sections.

3.3.1 Latent Operation Identification

One way of achieving a tradeoff between latency minimization and efficiency includes first recognizing that certain operations performed by the components of the data processing graph may take a long time relative to the time required to spawn a task. These operations are sometimes referred to as "latent operations." Certain other operations may take a short amount of time relative to the time required to spawn a task.

In situations where two or more of the components in the execution set 668 can possibly run concurrently, the compiler/interpreter 120 determines whether or not to allow concurrent execution of the operations of the execution set 668 based on an estimate of how much time the operations for the components of the execution set 668 will take to complete. If any latent operations are identified in the execution set, then the components of the execution set 668 are allowed to execute concurrently. If no latent operations are identified in the execution set 668, then concurrent execution of the components of the execution set 668 is not allowed.

In some examples, to determine how long the operations for the components of the execution set 668 will take to complete, the compiler/interpreter 120 examines transactional code (e.g., DML code as is described in above) that is associated with the components to identify latent operations such as database accesses, lookup file operations, remote procedure calls, service calls, and so on. In other examples, the compiler/interpreter 120 uses runtime instrumentation to measure the time that tasks take to complete over a number of executions of the data processing graph 600. The data processing graph 600 can be recompiled on-the-fly or offline based on the measured time that the tasks take to complete.

Figure 9A:
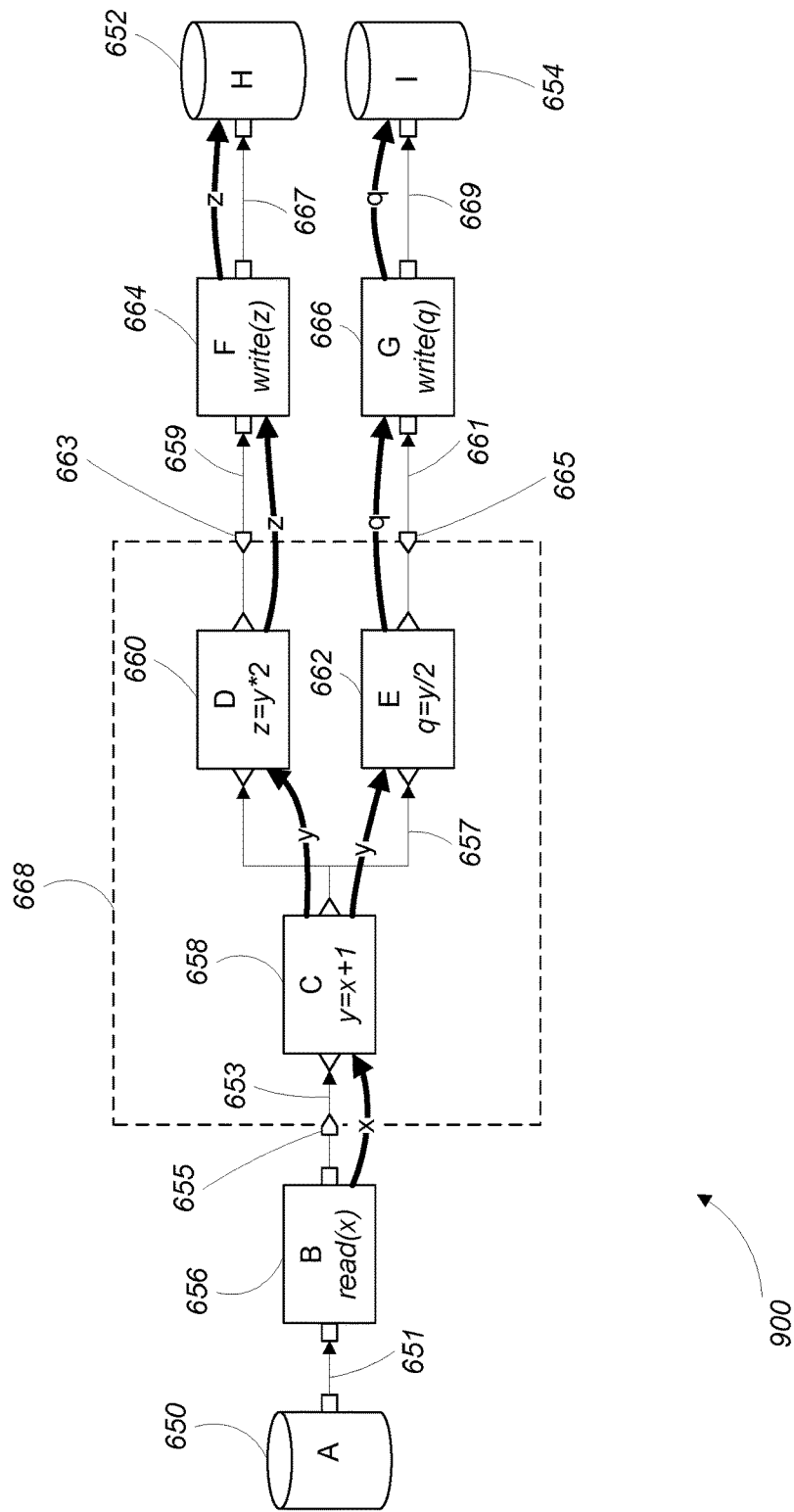
FIG. 9A is a data processing graph including an execution set including components without any latent operations.

Referring to FIG. 9A, in one very simple and illustrative example, a data processing graph 900 is configured such that a first component, B 656 reads a value, x from the data source 650 and sends x to a second component, C 658. The second component, C 658 computes a value, y by adding 1 to x and sends the value, y to a third component, D 660 and to a fourth component, E 662. The third component, D 660 computes a value, z by multiplying y by 2 and sends z to a fifth component, F 664. The fourth component, E 662 computes a value, q by dividing y by 2 and sends q to a seventh component, G 666. The fifth component, F 665 writes the value, z to the first data sink, H 652. A sixth component, G 666 writes the value, q to the second data sink, I 654.

When the compiler/interpreter 120 analyzes the execution set 668 of the data processing graph 900 of FIG. 9A, the transactional code of the second component, C 658, the third component, D 660, and the fourth component, E 662 is examined to determine whether any of the components include latent operations. In the example of FIG. 9A, no latent operations are identified since all of the operations performed by the components are simple arithmetic operations, which complete in a very short amount of time.

Since no latent operations are identified in the execution set 668, the components of the execution set 668 are not allowed to execute concurrently. To that end, during the control graph generation procedure, the second component, C 658, the third component, D 660, and the fourth component, E 662 are grouped into a single task group. When the data processing graph executes, a single task is spawned for the single task group and the operations for the second component, C 658, the third component, D 660, and the fourth component, E 662 execute in the single task (as in FIG. 8). With each component of the first execution set 668 executing in a single task, the third component, D 660 and the fourth component, E 662 are forced to execute serially, after the operations of the second component, C 658.

Figure 9B:
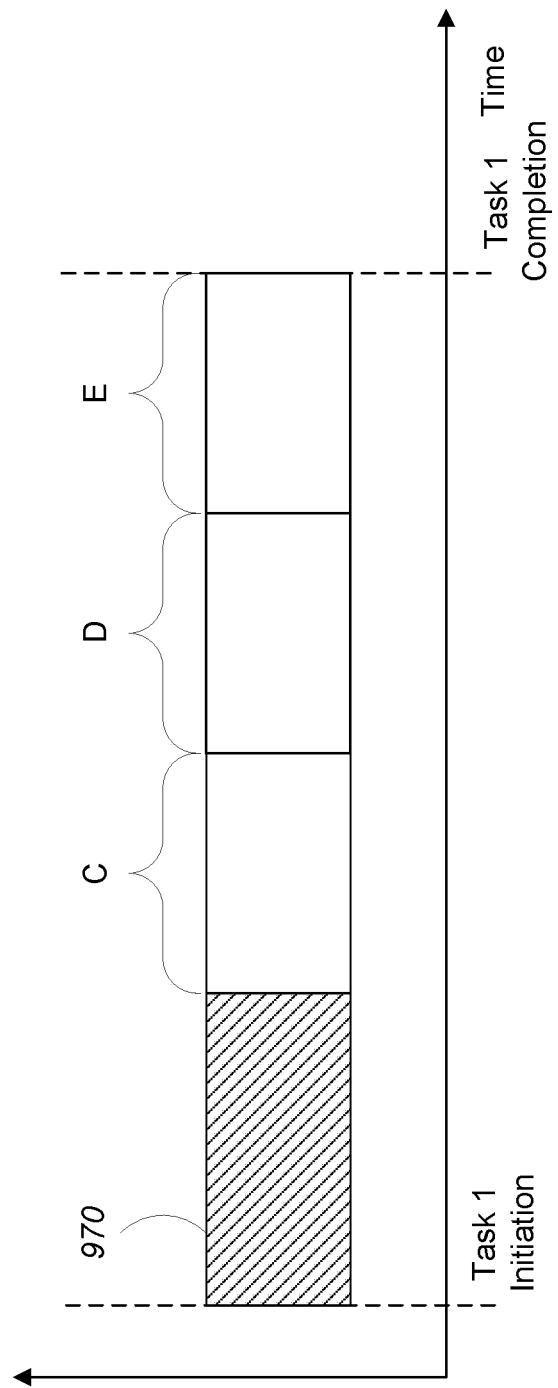
FIG. 9B is an illustration of execution of operations of the execution set of FIG. 9A.

Referring to FIG. 9B, when the single task (i.e., Task 1) is spawned (i.e., at Task 1 initiation), first overhead 970 is incurred and the second component, C 658 begins executing. Upon completion of execution of the second component, C 658, the third component begins executing. Upon completion of execution of the third component, D 660, the fourth component, E 662 executes, after which the single task completes.

By executing the three components serially in a single task (i.e., Task 1), the total time of execution of the three components is greater than if concurrent execution of at least some of the components were allowed. However, executing in a single task (or a reduced number of tasks) results in a reduced amount of task initiation-related overhead since only first overhead 970 for initiating the single task is incurred. As is noted above, this tradeoff between overhead and overall execution time is often desirable when no latent operations are present in an execution set. As a comparison, FIG. 9C shows the total time of execution 980, including overhead, that results from the operations of the three components using the allowed concurrency between the third component, D 660 and the fourth component, E 662 to execute them concurrently in separate tasks (i.e., Tasks 2 and 3) after a task (Task 1) for the second component, C 658. It is apparent that the total time of execution 982 for the reduced concurrency execution is shorter in this case.

Figure 10A:
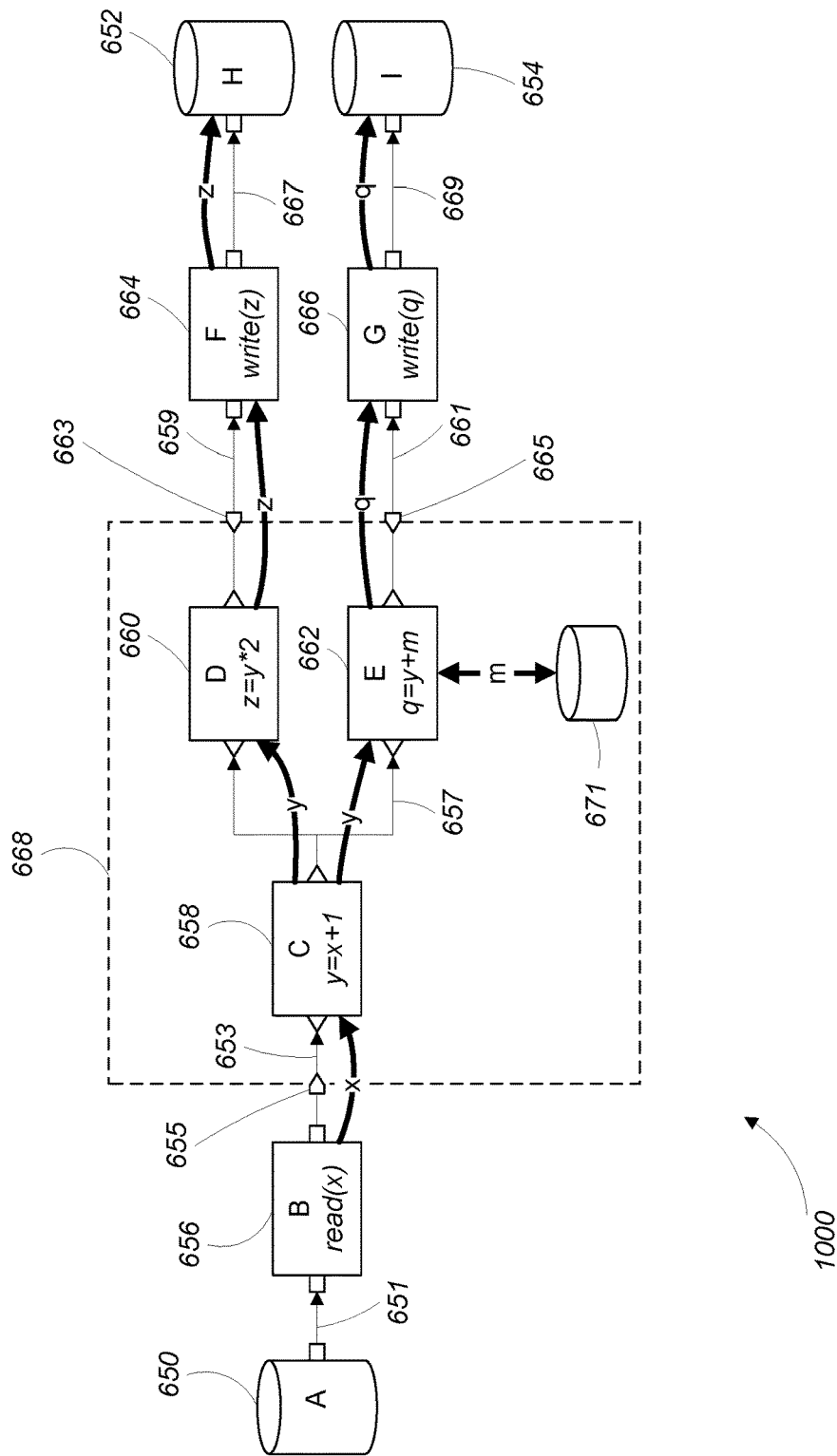
FIG. 10A is a data processing graph including an execution set including a component with a latent operation.

Referring to FIG. 10A, in another simple and illustrative example, a data processing graph 1000 is configured such that a first component, B 656 reads a value, x from a data source 650 and sends x to a second component, C 658. The second component, C 658 computes a value, y by adding 1 to x and sends the value, y to a third component, D 660 and to a fourth component, E 662. The third component, D 660 computes a value, z by multiplying y by 2 and sends z to a fifth component, F 664. The fourth component, E 662 computes a value, q by reading a value, m from a data store 671 (e.g., a lookup file or a database) and summing m and y. The fourth component, E662 sends q to a seventh component, G 666. The fifth component, F 665 writes the value, z to a first data sink, H 652. The sixth component, G 666 writes the value, q to a second data sink, I 654.

When the compiler/interpreter 120 analyzes the execution set 668 of the data processing graph 1000 of FIG. 10A, the transactional code of the second component, C 658, the third component, D 660, and the fourth component, E 662 is examined to determine whether any of the components include latent operations. In the example of FIG. 10A, the fourth component, E 662 is identified as including a latent operation since it reads a value from the data store 671.

Since a latent operation is identified in the execution set 668, the components of the data processing graph 1000 are allowed to execute concurrently. To that end, during the control graph generation procedure, the second component, C 658, the third component, D 660, and the fourth component, E 662 are each grouped into a different task group (e.g., a first task group, a second task group, and a third task group). When the data processing graph 600 executes, a different task is spawned for each of the task groups (e.g., a first task for the first task group for executing operations of the second component, C 658, a second task for the second task group for executing operations of the third component, D 660, and a third task for the third task group for executing operations of the fourth component, E 662 (as in FIG. 7). With each component of the first execution set 668 executing in a separate task, the third component, D 660 is able to execute concurrently with the fourth component, E 662.

Figure 10B:
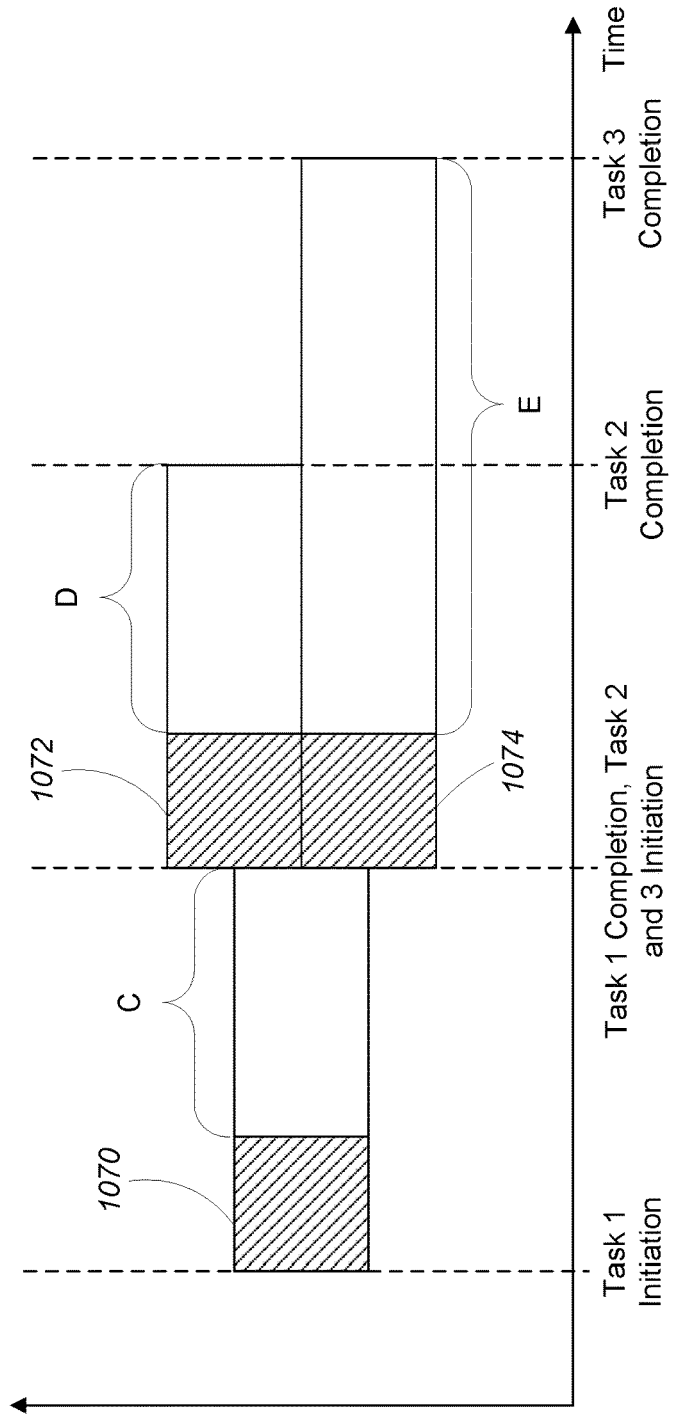
FIG. 10B is an illustration of execution of operations of the execution set of FIG. 10A.

Referring to FIG. 10B, when the first task (i.e., Task 1) is spawned (i.e., at Task 1 initiation) first overhead 1070 is incurred and the second component, C 658 begins executing. Upon completion of execution of the second component, C 658, the first task completes and the second task and the third task are spawned concurrently (at Task 1 completion), incurring second overhead 1072 and third overhead 1074, respectively. The third component, D 660 executes in the second task concurrently with execution of the fourth component, E 662 in the third task. Since the fourth component, E 662 is a latent operation and the third component, D 660 is not a latent operation, the third component, D 660 completes execution before the fourth component, E 662, causing completion of the second task (i.e., at Task 2 completion). The fourth component, E 662 continues executing in the third task until completion, causing completion of the third task (i.e., at Task 3 completion). Note that the time scale of the timeline of FIG. 10B is different from the time scale of the timeline of FIG. 9B, showing the same absolute amount of overhead time having different durations relative to the task times.

As a comparison, FIG. 10C shows that, in this case, by executing the third component, D 660 and the fourth component, E 662 concurrently in separate tasks (i.e., Tasks 2 and 3), the total time of execution 1080 of the three components is less than the total time of execution 1082 that would result if reduced concurrency (in this case serial) execution of the components were used. This is true even though an amount of overhead incurred by instantiating three separate tasks is greater than it would be if a single task were used for reduced concurrency execution. As is noted above, this tradeoff between overall execution time and overhead is often desirable when latent operations are present in an execution set.

It is noted that other groupings of components into task groups (and eventually individual tasks) that allow for concurrent execution may also be used. For example, rather than being grouped into separate task groups, the second component, C 658 and the third component, D 660 may be grouped into the same task group and eventually executed in a single task. Of course, the single task in which the operations of the fourth component, E 662 executes can still execute concurrently with the task in which the operations of the second component, C 658 and third component, D 660 execute, as long as the serial constraint imposed by the serial to serial connection between the second component, C 658 and the fourth component, E 662 is met.

3.3.2 Nested Execution Set Identification

Another way of achieving a tradeoff between latency minimization and efficiency includes recognizing that any "nested" execution sets included in an execution set may take a long time relative to the time required to spawn a task. For example, a nested execution set may process a large amount of data from an upstream collection port, including either looping through the data or spawning a large number of tasks to process the data concurrently.

Thus, in some examples, where two or more of the components in a first execution set can possibly run concurrently, the compiler/interpreter 120 determines whether or not to allow concurrent execution of the operations of the first execution set based on the presence of other, nested execution sets included in the first execution set. If any nested execution sets are identified, then the components of the first execution set are allowed to execute concurrently. If no nested execution sets are identified in the first execution set, then concurrent execution of the components of the first execution set is not allowed.

Figure 11:
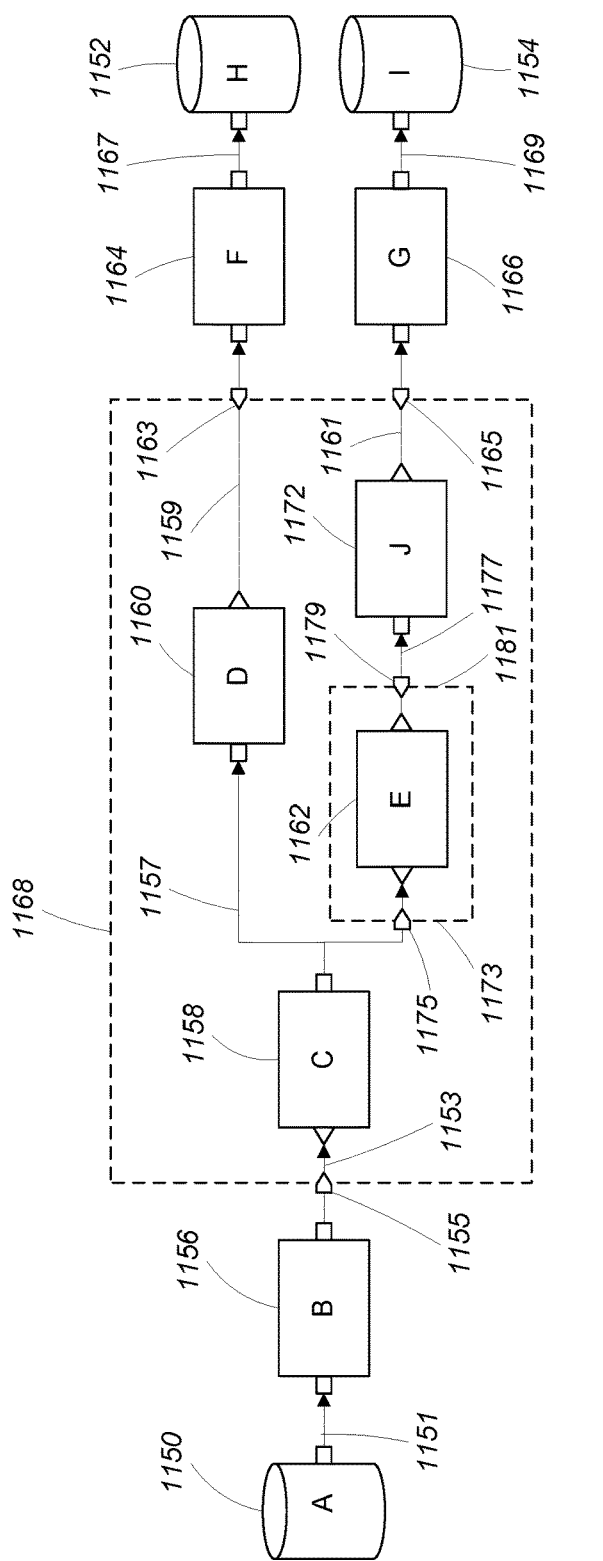
FIG. 11 is a data processing graph including an execution set that includes a nested execution set.

Referring to FIG. 11, an exemplary data processing graph 1100 receives input data from a data source, A 1150, processes the input data using a number of components, and stores the results of processing the data in a first data sink, H 1152 and a second data sink, I 1154. The components of the data processing graph 1100 include a first component, B 1156, a second component, C 1158, a third component, D 1160, a fourth component, E 1162, a fifth component, J 1172, a sixth component, F 1164, and a seventh component, G 1166.

A first flow 1151 connects an output collection port of the data source 1150 to an input collection port of the first component, B 1156. A second flow 1153 connects an output collection port of the first component, B 1156 to an input scalar port of the second component, C 1158. Note that since the second flow 1153 connects a output collection port to a input scalar port, a first execution set entry point 1155 exists between the first component, B 1156 and the second component, C 1158.

A third flow 1157 connects an output collection port of the second component, C 1158 to an input collection port of the third component, D 1160 and to an input scalar port of the fourth component, E 1162. Note that since the third flow connects an output collection port of the second component, C 1158 to an input scalar port of the fourth component, E 1162, a second execution set entry point 1175 exists between the second component, C 1158 and the fourth component, E 1162.

A fourth flow 1159 connects an output scalar port of the third component, D 1160 to an input collection port of the sixth component, F 1164. Note that since the fourth flow connects an output scalar port to an input collection port, a first execution set exit point 1163 exists between the third component, D 1160 and the sixth component, F 1164.

A fifth flow 1177 connects an output scalar port of the fourth component, E 1162 to an input collection port of the fifth component, J 1172. Note that since the fifth flow 1177 connects an output scalar port to an input collection port, a second execution set exit point 1179 exists between the fourth component, E 1162 and the fifth component, J 1172.

A sixth flow 1161 connects an output scalar port of the fifth component, J 1172 to an input collection port of the seventh component, G 1166. Note that since the sixth flow 1161 connects an output scalar port to an input collection port, a third execution set exit point 1165 exists between the fifth component, J 1172 and the seventh component, G 1166.

A seventh flow 1167 connects the output collection port of the sixth component, F 1164 to the input collection port of the first data sink, H 1152. An eighth flow 1169 connects the output collection port of the seventh component, G 1166 to the input collection port of the second data sink, I 1154.

When the compiler/interpreter 120 prepares the data processing graph 1100 for execution, it first performs an execution set discovery pre-processing procedure to identify a hierarchy of potentially nested execution sets of components. For the exemplary data processing graph 1100 of FIG. 11, the execution set discovery pre-processing procedure identifies a first execution set 1168 and a second execution set 1181 nested within the first execution set 1168. The first execution set 1168 is delimited by the first execution set entry point 1155, the first execution exit point 1163, and the third execution set exit point 1165. The second execution set 1181 is delimited by the second execution set entry point 1175 and the second execution set exit point 1179. As is apparent from the figure, the first execution set 1168 includes the second component, C 1158, the third component, D 1160, the fifth component, J 1172, and the second execution set 1181 which includes the fourth component, E 1162.

In FIG. 11, the compiler/interpreter 120 determines that the second execution set 1181 is nested within the first execution set 1186. Since a nested execution set is identified in the first execution set 1168, concurrent execution is allowed for the components in the first execution set 1168. To that end, during the control graph generation procedure, the second component, C 1158, the third component, D 1160, the fourth component, E 1162, and the fifth component, J 1172 are each grouped into a different task group (e.g., a first task group, a second task group, a third task group, and a fourth task group). When the data processing graph 1100 executes, a different task is spawned for each of the task groups (e.g., a first task for the first task group for executing operations of the second component, C 1158, a second task for the second task group for executing operations of the third component, D 1160, a third task for the third task group for executing operations of the fourth component, E 1162, and a fourth task for the fourth task group for executing operations of the fifth component, J 1172. With each component of the first execution set 1168 executing in a separate task, the third component, D 1160 is able to execute concurrently with one or both of the fourth component, E 1162 and the fifth component, J 1172.

It is noted that other groupings of components into task groups (and eventually individual tasks) that allow for concurrent execution may also be used. For example, rather than being grouped into separate task groups, the second component, C 1158 and the third component, D 1160 may be grouped into the same task group and eventually executed in a single task. Of course, the single task in which the operations of the fourth component, E 1162 and the fifth component, J 1172 execute can still execute concurrently with the task in which the operations of the second component, C 1158 and third component, D 1160 execute.

3.3.3 Internal Execution Set Concurrency Identification

Another way of achieving a tradeoff between latency minimization and efficiency includes determining whether any possible concurrency exists within an execution set. For example, two components may exist in the execution set 1268 where a first component of the two components has an output collection port connected by a flow to an input collection port of a second component of the two components (i.e., a collection-to-collection port connection). In this case, the two components have the possibility of being allowed to execute concurrently, even though they are in the same execution set.

In some examples, where two or more of the components in a first execution set can possibly run concurrently, the compiler/interpreter 120 determines whether or not to allow concurrent execution of the operations of the first execution set based on the topology of the data processing graph and certain runtime characteristics. If any possible concurrency is identified in the first execution set, then the components of the first execution set may be allowed to execute concurrently. If no possible concurrency is identified in the first execution set, then concurrent execution of the components of the first execution set is not allowed. If there is possible concurrency, then there may be different levels of concurrency that are actually used at runtime. For example, a highest level of concurrency that is possible may allow 90% of the components to execute concurrently; and a reduced level of concurrency of 10% of the components executing concurrently may be actually used at runtime (enforced by generated code) to make tradeoffs based on certain factors.

Figure 12:
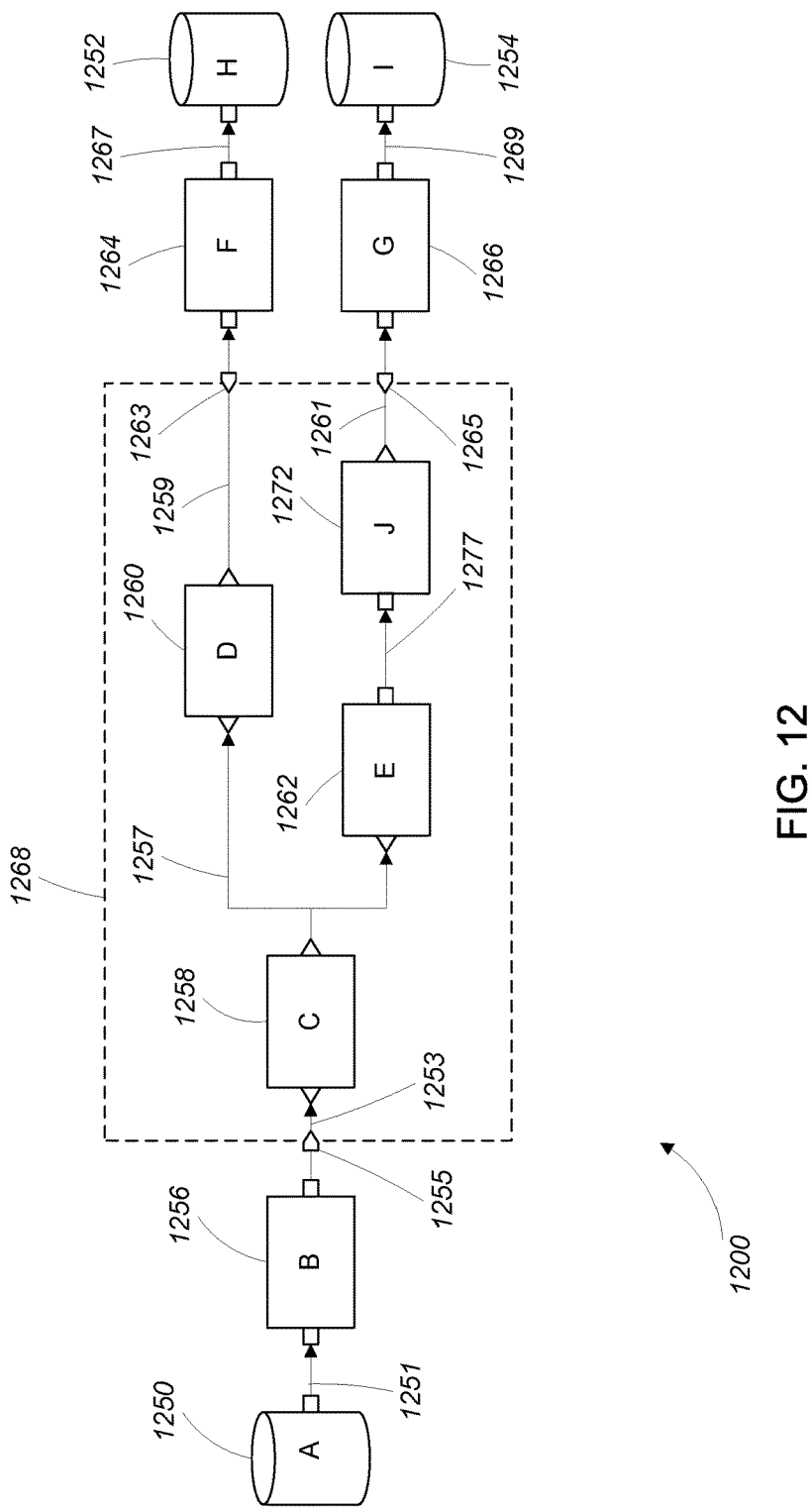
FIG. 12 is a data processing graph including an execution set that includes an implicit execution set.

Referring to FIG. 12, an exemplary data processing graph 1200 receives input data from a data source, A 1250, processes the input data using a number of components, and stores the results of processing the data in a first data sink, H 1252 and a second data sink, I 1254. The components of the data processing graph 1200 include a first component, B 1256, a second component, C 1258, a third component, D 1260, a fourth component, E 1262, a fifth component, J 1272, and a sixth component, F 1264, and a seventh component, G 1266.

A first flow 1251 connects an output collection port of the data source 1250 to an input collection port of the first component, B 1256. A second flow 1253 connects an output collection port of the first component, B 1256 to an input scalar port of the second component, C 1258. Note that since the second flow 1253 connects an output collection port to an input scalar port, a first execution set entry point 1255 exists between the first component, B 1256 and the second component, C 1258.

A third flow 1257 connects an output scalar port of the second component, C 1258 to an input scalar port of the third component, D 1260 and to an input scalar port of the fourth component, E 1262.

A fourth flow 1259 connects an output scalar port of the third component, D 1260 to an input collection port of the sixth component, F 1264. Note that since the fourth flow connects an output scalar port to an input collection port, a first execution set exit point 1263 exists between the third component, D 1260 and the sixth component, F 1264.

A fifth flow 1277 connects an output collection port of the fourth component, E 1262 to an input collection port of the fifth component, J 1272.

A sixth flow 1261 connects an output scalar port of the fifth component, J 1272 to an input collection port of the seventh component, G 1266. Note that since the sixth flow 1261 connects an output scalar port to an input collection port, a third execution set exit point 1265 exists between the fifth component, J 1272 and the seventh component, G 1266.

A seventh flow 1267 connects the output collection port of the sixth component, F 1264 to the input collection port of the first data sink, H 1252. An eighth flow 1269 connects the output collection port of the seventh component, G 1266 to the input collection port of the second data sink, I 1254.

When the compiler/interpreter 120 prepares the data processing graph 1200 for execution, it first performs an execution set discovery pre-processing procedure to identify a hierarchy of potentially nested execution sets of components. For the exemplary data processing graph 1200 of FIG. 12, the execution set discovery pre-processing procedure identifies a single execution set 1268. The execution set 1268 is delimited by the first execution set entry point 1255, the first execution exit point 1263, and the third execution set exit point 1265. As is apparent from the figure, the execution set 1268 includes the second component, C 1258, the third component, D 1260, the fifth component, J 1272, and the fourth component, E 1262.

In FIG. 12, the compiler/interpreter 120 also identifies a level of concurrency that is possible within the execution set 1268 by recognizing the collection port to collection port connection between the fourth component, E 1262 and the fifth component, J 1272, and the overall topology of the components within the execution set 1268. Since possible concurrency is identified in the execution set 1268, concurrent execution is allowed for at least some of the components in the execution set 1268. To that end, during the control graph generation procedure, the second component, C 1258, the third component, D 1260, the fourth component, E 1262, and the fifth component, J 1272 are each grouped into a different task group (e.g., a first task group, a second task group, a third task group, and a fourth task group). Each task group includes operations of one or more components, with the entire task group being executed by a single task (e.g., a process or thread) that will be spawned at runtime. Assigning each component to its own task group enables a high level of concurrency at runtime. To enforce a reduced level of concurrency at runtime, multiple components can be assigned to the same task group, with a corresponding task executing the operations of the components serially (i.e., without concurrency).

When the data processing graph 1200 executes, a different task is spawned for each of the task groups (e.g., a first task for the first task group for executing operations of the second component, C 1258, a second task for the second task group for executing operations of the third component, D 1260, a third task for the third task group for executing operations of the fourth component, E 1262, and a fourth task for the fourth task group for executing operations of the fifth component, J 1272). With each component of the execution set 1268 executing in a separate task, the third component, D 1260 is able to execute concurrently with one or both of the fourth component, E 1262 and the fifth component, J 1272. However, there may still be some constraints enforced between different tasks according to the ports of the components, such as the connected serial ports between the second component, C 1258 and the third component, D1260, and between the second component, C 1258 and the fourth component, E1262.

It is noted that other groupings of components into task groups (and eventually individual tasks) that allow for different levels of concurrent execution may also be used. For example, rather than being grouped into separate task groups, the second component, C 1258 and the third component, D 1260 may be grouped into the same task group and eventually executed in a single task. A single task group and eventual task in which the operations of the fourth component, E 1262 and the fifth component, J 1272 execute can also be assigned. That single task could then execute concurrently with the task in which the operations of the second component, C 1258 and third component, D 1260 execute, as long as the second component, C 1258 has finished executing before the fourth component, E1262 begins executing. Thus, the number of, and composition of, the task groups represented in the code generated by the compiler/interpreter 120 is able to enforce different levels of concurrency in the entire group of operations corresponding to the components in an execution set.

4 Alternatives

In some examples, if the components of an execution set are only connected to one another by connections from output scalar ports to input scalar ports (i.e., scalar port to scalar port connections), then the compiler/interpreter 120 automatically assigns the operations of the components of the execution set in a single task group, which are then constrained to execute serially by a single task.

In general, the decision to allow or disallow concurrency between particular components within an execution set, changing the level of concurrency, only applies to the execution set and does not necessarily apply to components or execution sets nested within the execution set (i.e., at lower levels of the execution set hierarchy).

In some examples, when concurrency is not allowed in a given execution set, a topologically sorted order for the components in the execution is determined and the operations for the components in the given execution set are executed in a single task in the topologically sorted order.

In some examples, a latent operation is defined as an operation that takes a long time to complete relative to the time required to spawn a task. In some examples, a latent operation is defined as an operation that takes at least three times longer than the time required to spawn a task. In some examples, a latent operation is defined as an operation that takes at least ten times longer than the time required to spawn a task.

In some examples, a user specifies the characteristics that define a latent operation. In some examples, a user explicitly specifies which components include latent operations. In some examples, a user can explicitly specify a compilation mode (i.e., concurrent or non-concurrent) for an execution set.

In some examples, the approaches described above are only performed if the possibility of concurrent execution exists in an execution set. For example, the compiler/interpreter 120 may walk the portion of the data processing graph included in the execution set to determine whether concurrent execution is possible before performing the approaches described above. In some examples, the compiler/interpreter 120 determines a maximal concurrency for the portion of the data flow graph included in the execution set.

Each of the examples described above highlights one runtime characteristic of one or more components that may cause the components of an execution set to be compiled such that they execute either concurrently or sequentially. However, an execution set may include components with a combination of any number of these characteristics (e.g., latent operations, nested execution sets, implicit execution sets, and so on). In some examples, if one or more components in an execution set include a characteristic indicating that the operations of the components will take a long time to complete relative to the time required to spawn a task, then the execution set is compiled such that concurrent execution is allowed.

The data processing graph compilation approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of data processing graphs. The modules of the program (e.g., elements of a data processing graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for compiling a graph-based program specification to execute on a computing system that supports concurrent execution of operations, the method including:
   receiving the graph-based program specification, the graph-based program specification including a graph that includes:
      a plurality of components, each corresponding to at least one operation and including one or more ports, the ports including scalar data ports for sending or receiving a single data element at a time and collection data ports for sending or receiving a collection of multiple data elements at a time; and
      a plurality of directed links, each directed link connecting an upstream component of the plurality of components to a downstream component of the plurality of components; and
   processing the graph-based program specification to generate processed code representing one or more groups of operations, the processing including:
      identifying a first boundary of a first group of the operations including identifying a first entry point to the first group of operations and a first exit point from the first group of the operations based on a first identification of one or more links connecting a collection data port of a component to a scalar data port of a component of the plurality of components;

identifying a possible level of concurrency in the first group of the operations based at least in part on a topology of the graph, such that multiple operations in the first group are not prevented by the topology of the graph from executing concurrently;

analyzing at least some of the operations in the first group to determine runtime characteristics associated with the analyzed operations, the analyzing including identifying a second boundary of an iterating set of operations in the first group of operations including identifying a second entry point to the iterating set of operations and a second exit point from the iterating set of operations based on a second identification of one or more links connecting a collection data port of a component to a scalar data port of a component of the plurality of components; and generating processed code for executing the operations in the first group, where the processed code enforces a reduced level of concurrency in the first group, lower than the identified possible level of concurrency, based at least in part on the determined runtime characteristics.

2. The method of claim 1 wherein analyzing at least some of the operations in the first group to determine runtime characteristics associated with the analyzed operations includes, for each of the analyzed operations, determining if that analyzed operation is a latent operation that potentially performs a computation over a period of time that is larger than a first threshold or that potentially waits for a response for a period of time that is larger than the first threshold.

3. The method of claim 2 wherein analyzing at least some of the operations in the first group to determine runtime characteristics associated with the analyzed operations includes, for each of the analyzed operation, determining if that analyzed operation is a member of the iterating set, wherein the iterating set includes a set of one or more operations that executes multiple times in response to a single initiation of execution of the first group.

4. The method of claim 3 wherein the first threshold is defined as a first period of time greater than a second period of time required to spawn a task for executing one or more operations.

5. The method of claim 3 wherein the processed code enforces a reduced level of concurrency in the first group, lower than the identified possible level of concurrency, if neither of these conditions is met:

(1) at least two operations in the first group that are not prevented by the topology of the graph from executing concurrently were both determined to be latent operations, or (2) at least one operation in the first group was determined to be a member of the iterating set of one or more operations.

6. The method of claim 5 wherein the processed code enforces a reduced level of concurrency in the first group, lower than the identified possible level of concurrency, if the following additional condition is also not met: (3) a configuration of two or more operations in the first group imply an existence of the iterating set.

7. The method of claim 1 wherein enforcing a reduced level of concurrency in the first group, lower than the identified possible level of concurrency, includes enforcing serial execution of all of the operations in the first group.

8. The method of claim 1 wherein one or more of the directed links indicate data flow between an upstream component and a downstream component.

9. The method of claim 8 wherein one or more of the directed links indicate control flow between an upstream component and a downstream component.

10. The method of claim 1 wherein one or more of the directed links indicate control flow between an upstream component and a downstream component.

11. The method of claim 1 wherein processing the graph-based program specification to generate processed code representing one or more groups of operations further includes:

generating ordering information that specifies at least a partial ordering among the first group of the operations, where the ordering information is based at least in part on the topology of the graph; and wherein identifying the possible level of concurrency in the first group includes identifying a level of concurrency allowed by the partial ordering such that multiple operations in the first group are not prevented by the partial ordering from executing concurrently.

12. The method of claim 11 wherein generating the ordering information includes topologically sorting the first group of operations.

13. Software stored in a non-transitory form on a computer-readable medium, for compiling a graph-based program specification to execute on a computing system that supports concurrent execution of operations, the software including instructions for causing the computing system to:

receive the graph-based program specification, the graph-based program specification including a graph that includes:

a plurality of components, each corresponding to an operation and including one or more ports, the ports including scalar data ports for sending or receiving a single data element at a time and collection data ports for sending or receiving a collection of multiple data elements at a time; and a plurality of directed links, each directed link connecting an upstream component of the plurality of components to a downstream component of the plurality of components; and process the graph-based program specification to generate processed code representing one or more groups of operations, the processing including:

identifying a first boundary of a first group of the operations including identifying a first entry point to the first group of operations and a first exit point from the first group of the operations based on a first identification of one or more links connecting a collection data port of a component to a scalar data port of a component of the plurality of components;

identifying a possible level of concurrency in the first group of the operations based at least in part on a topology of the graph, such that multiple operations in the first group are not prevented by the topology of the graph from executing concurrently;

analyzing at least some of the operations in the first group to determine runtime characteristics associated with the analyzed operations, the analyzing including identifying a second boundary of an iterating set of operations in the first group of operations including identifying a second entry point to the iterating set of operations and a second exit point from the iterating set of operations based on a second identification of one or more links connecting a collection data port of a component to a scalar data port of a component of the plurality of components; and generating processed code for executing the operations in the first group, where the processed code enforces a reduced level of concurrency in the first group, lower than the identified possible level of concurrency, based at least in part on the determined runtime characteristics.

14. A computing system for compiling a graph-based program specification, the computing system including:

an input device or port configured to receive the graph-based program specification, the graph-based program specification including a graph that includes:

a plurality of components, each corresponding to an operation and including one or more ports, the ports including scalar data ports for sending or receiving a single data element at a time and collection data ports for sending or receiving a collection of multiple data elements at a time; and a plurality of directed links, each directed link connecting an upstream component of the plurality of components to a downstream component of the plurality of components; and at least one hardware processor configured to process the graph-based program specification to generate processed code representing one or more groups of operations, the processing including:

identifying a first boundary of a first group of the operations including identifying a first entry point to the first group of operations and a first exit point from the first group of the operations based on a first identification of one or more links connecting a collection data port of a component to a scalar data port of a component of the plurality of components;

identifying a possible level of concurrency in the first group of the operations based at least in part on a topology of the graph, such that multiple operations in the first group are not prevented by the topology of the graph from executing concurrently;

analyzing at least some of the operations in the first group to determine runtime characteristics associated with the analyzed operations, the analyzing including identifying a second boundary of an iterating set of operations in the first group of operations including identifying a second entry point to the iterating set of operations and a second exit point from the iterating set of operations based on a second identification of one or more links connecting a collection data port of a component to a scalar data port of a component of the plurality of components; and generating processed code for executing the operations in the first group, where the processed code enforces a reduced level of concurrency in the first group, lower than the identified possible level of concurrency, based at least in part on the determined runtime characteristics.

15. A computing system for compiling a graph-based program specification, the computing system including:

means for receiving the graph-based program specification, the graph-based program specification including a graph that includes:

a plurality of components, each corresponding to an operation and including one or more ports, the ports including scalar data ports for sending or receiving a single data element at a time and collection data ports for sending or receiving a collection of multiple data elements at a time; and a plurality of directed links, each directed link connecting an upstream component of the plurality of components to a downstream component of the plurality of components; and means for processing the graph-based program specification to generate processed code representing one or more groups of operations, the processing including:

identifying a first boundary of a first group of the operations including identifying a first entry point to the first group of operations and a first exit point from the first group of the operations based on a first identification of one or more links connecting a collection data port of a component to a scalar data port of a component of the plurality of components;

identifying a possible level of concurrency in the first group of the operations based at least in part on a topology of the graph, such that multiple operations in the first group are not prevented by the topology of the graph from executing concurrently;

analyzing at least some of the operations in the first group to determine runtime characteristics associated with the analyzed operations, the analyzing including identifying a second boundary of an iterating set of operations in the first group of operations including identifying a second entry point to the iterating set of operations and a second exit point from the iterating set of operations based on a second identification of one or more links connecting a collection data port of a component to a scalar data port of a component of the plurality of components; and generating processed code for executing the operations in the first group, where the processed code enforces a reduced level of concurrency in the first group, lower than the identified possible level of concurrency, based at least in part on the determined runtime characteristics.

16. The method of claim 1 wherein identifying the first entry point includes identifying a transition from a collection output port of a first component associated with a first operation to a scalar input port of a second component associated with a second operation included in the first group of operations and identifying the first exit point includes identifying a transition from a scalar output port of a third component associated with a third operation included in the first group of operations to a collection input port of a fourth component associated with a fourth operation.

17. The method of claim 1 wherein identifying the second entry point includes identifying a transition from a collection output port of a first component associated with a first operation to a scalar input port of a second component associated with a second operation included in the iterating set of operations and identifying the first exit point includes identifying a transition from a scalar output port of a third component associated with a third operation included in the iterating set of operations to a collection input port of a fourth component associated with a fourth operation.

18. The software of claim 13 wherein analyzing at least some of the operations in the first group to determine runtime characteristics associated with the analyzed operations includes, for each of the analyzed operations, determining if that analyzed operation is a latent operation that potentially performs a computation over a period of time that is larger than a first threshold or that potentially waits for a response for a period of time that is larger than the first threshold.

19. The software of claim 18 wherein analyzing at least some of the operations in the first group to determine runtime characteristics associated with the analyzed operations includes, for each of the analyzed operation, determining if that analyzed operation is a member of the iterating set, wherein the iterating set includes a set of one or more operations that executes multiple times in response to a single initiation of execution of the first group.

20. The software of claim 19 wherein the first threshold is defined as a first period of time greater than a second period of time required to spawn a task for executing one or more operations.

21. The software of claim 19 wherein the processed code enforces a reduced level of concurrency in the first group, lower than the identified possible level of concurrency, if neither of these conditions is met:
 (1) at least two operations in the first group that are not prevented by the topology of the graph from executing concurrently were both determined to be latent operations, or
 (2) at least one operation in the first group was determined to be a member of the iterating set of one or more operations.

22. The software of claim 21 wherein the processed code enforces a reduced level of concurrency in the first group, lower than the identified possible level of concurrency, if the following additional condition is also not met: (3) a configuration of two or more operations in the first group imply an existence of the iterating set.

23. The software of claim 13 wherein enforcing a reduced level of concurrency in the first group, lower than the identified possible level of concurrency, includes enforcing serial execution of all of the operations in the first group.

24. The software of claim 13 wherein processing the graph-based program specification to generate processed code representing one or more groups of operations further includes:
 generating ordering information that specifies at least a partial ordering among the first group of the operations, where the ordering information is based at least in part on the topology of the graph; and
 wherein identifying the possible level of concurrency in the first group includes identifying a level of concurrency allowed by the partial ordering such that multiple operations in the first group are not prevented by the partial ordering from executing concurrently.

25. The software of claim 13 wherein identifying the first entry point includes identifying a transition from a collection output port of a first component associated with a first operation to a scalar input port of a second component associated with a second operation included in the first group of operations and identifying the first exit point includes identifying a transition from a scalar output port of a third component associated with a third operation included in the first group of operations to a collection input port of a fourth component associated with a fourth operation.

26. The software of claim 13 wherein identifying the second entry point includes identifying a transition from a collection output port of a first component associated with a first operation to a scalar input port of a second component associated with a second operation included in the iterating set of operations and identifying the first exit point includes identifying a transition from a scalar output port of a third component associated with a third operation included in the iterating set of operations to a collection input port of a fourth component associated with a fourth operation.

27. The computing system of claim 14 wherein analyzing at least some of the operations in the first group to determine runtime characteristics associated with the analyzed operations includes, for each of the analyzed operations, determining if that analyzed operation is a latent operation that potentially performs a computation over a period of time that is larger than a first threshold or that potentially waits for a response for a period of time that is larger than the first threshold.

28. The computing system of claim 27 wherein analyzing at least some of the operations in the first group to determine runtime characteristics associated with the analyzed operations includes, for each of the analyzed operation, determining if that analyzed operation is a member of the iterating set, wherein the iterating set includes a set of one or more operations that executes multiple times in response to a single initiation of execution of the first group.

29. The computing system of claim 28 wherein the first threshold is defined as a first period of time greater than a second period of time required to spawn a task for executing one or more operations.

30. The computing system of claim 28 wherein the processed code enforces a reduced level of concurrency in the first group, lower than the identified possible level of concurrency, if neither of these conditions is met:
 (1) at least two operations in the first group that are not prevented by the topology of the graph from executing concurrently were both determined to be latent operations, or
 (2) at least one operation in the first group was determined to be a member of the iterating set of one or more operations.

31. The computing system of claim 30 wherein the processed code enforces a reduced level of concurrency in the first group, lower than the identified possible level of concurrency, if the following additional condition is also not met: (3) a configuration of two or more operations in the first group imply an existence of the iterating set.

32. The computing system of claim 14 wherein enforcing a reduced level of concurrency in the first group, lower than the identified possible level of concurrency, includes enforcing serial execution of all of the operations in the first group.

33. The computing system of claim 14 wherein processing the graph-based program specification to generate processed code representing one or more groups of operations further includes:
 generating ordering information that specifies at least a partial ordering among the first group of the operations, where the ordering information is based at least in part on the topology of the graph; and
 wherein identifying the possible level of concurrency in the first group includes identifying a level of concurrency allowed by the partial ordering such that multiple operations in the first group are not prevented by the partial ordering from executing concurrently.

34. The computing system of claim 14 wherein identifying the first entry point includes identifying a transition from a collection output port of a first component associated with a first operation to a scalar input port of a second component associated with a second operation included in the first group of operations and identifying the first exit point includes identifying a transition from a scalar output port of a third component associated with a third operation included in the first group of operations to a collection input port of a fourth component associated with a fourth operation.

35. The computing system of claim 14 wherein identifying the second entry point includes identifying a transition from a collection output port of a first component associated with a first operation to a scalar input port of a second component associated with a second operation included in the iterating set of operations and identifying the first exit point includes identifying a transition from a scalar output port of a third component associated with a third operation included in the iterating set of operations to a collection input port of a fourth component associated with a fourth operation.

* * * * *